US011803294B2

(12) United States Patent
Jo et al.

(10) Patent No.: US 11,803,294 B2
(45) Date of Patent: Oct. 31, 2023

(54) ELECTRONIC DEVICE AND OPERATION METHOD OF ELECTRONIC DEVICE PERFORMING CAPTURE FUNCTION

(71) Applicant: Samsung Electronics Co., Ltd., Gyeonggi-do (KR)

(72) Inventors: Minhwan Jo, Gyeonggi-do (KR); Sangsu Nam, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/684,945

(22) Filed: Mar. 2, 2022

(65) Prior Publication Data
US 2022/0317834 A1    Oct. 6, 2022

Related U.S. Application Data

(63) Continuation of application No. PCT/KR2022/002490, filed on Feb. 21, 2022.

(30) Foreign Application Priority Data

Apr. 6, 2021    (KR) .......................... 10-2021-0044512

(51) Int. Cl.
*G06F 3/048* (2013.01)
*G06F 3/0484* (2022.01)
*G06F 21/62* (2013.01)
*G06F 21/84* (2013.01)

(52) U.S. Cl.
CPC ........ *G06F 3/0484* (2013.01); *G06F 21/6245* (2013.01); *G06F 21/84* (2013.01)

(58) Field of Classification Search
CPC .......................... G06F 3/0484; G06F 21/6245
See application file for complete search history.

(56) References Cited

U.S. PATENT DOCUMENTS

| 9,519,376 | B2 | 12/2016 | Han et al. | |
| 9,773,024 | B2 * | 9/2017 | Lee .................... | G06F 3/04883 |
| 2002/0060816 | A1 * | 5/2002 | Dow .................. | H04N 1/00472 |
| | | | | 358/302 |

(Continued)

FOREIGN PATENT DOCUMENTS

| KR | 10-1500726 | 3/2015 |
| KR | 1020150075140 | 7/2015 |

(Continued)

OTHER PUBLICATIONS

Authors et al., Method of customized screen capture excluding sensitive information; 2019, IP.com PAD, 2 pages.*

(Continued)

*Primary Examiner* — Linh K Pham
(74) *Attorney, Agent, or Firm* — The Farrell Law Firm, P.C.

(57) ABSTRACT

An electronic device includes a display; and a processor operatively connected to the display, wherein the processor is configured to receive, from a user, a smart capture request for capturing a plurality of screens including a screen of an application being displayed on the display and a screen of an application not being displayed on the display, to smart capture the plurality of screens according to the request, and to generate a smart capture image based on the plurality of captured screens.

20 Claims, 18 Drawing Sheets

(56) References Cited

U.S. PATENT DOCUMENTS

| | | | |
|---|---|---|---|
| 2013/0111001 A1* | 5/2013 | Hamilton | H04L 41/04 709/223 |
| 2014/0289670 A1 | 9/2014 | Park et al. | |
| 2015/0007024 A1 | 1/2015 | Jeong et al. | |
| 2015/0178502 A1 | 6/2015 | Shin | |
| 2015/0281445 A1* | 10/2015 | Kumar | H04M 3/42221 379/88.01 |
| 2016/0216797 A1* | 7/2016 | Geng | G06F 40/117 |
| 2016/0313883 A1 | 10/2016 | Zhang | |
| 2017/0091340 A1 | 3/2017 | Yoon et al. | |
| 2017/0102836 A1* | 4/2017 | Yoon | G06F 16/957 |
| 2018/0095657 A1* | 4/2018 | Wang | G06F 1/1694 |
| 2021/0064222 A1* | 3/2021 | Mo | G06F 3/04842 |
| 2022/0050565 A1* | 2/2022 | Yi | G06F 3/04842 |
| 2022/0382448 A1* | 12/2022 | Lu | G06F 3/0482 |

FOREIGN PATENT DOCUMENTS

| | | |
|---|---|---|
| KR | 1020150110053 | 10/2015 |
| KR | 10-2016-0018769 | 2/2016 |
| KR | 1020170036317 | 4/2017 |
| KR | 10-2138501 | 7/2020 |
| KR | 10-2172354 | 10/2020 |

OTHER PUBLICATIONS

Authors et. al—Disclosed Anonymously, System and Method for Adjusting Lighting to improve Image Quality, IP.com, 2018, 24 pages.*

Kim et al., GUI Screen-Sharing Smart Remote Control for Smart TV User Interface, 2013, IEEE, 3 pages.*

Authors et al—2016, Smarter mask filter when sharing photos or screen captures to Internet, IP.com, 2016, 5 pages.*

International Search Report dated May 30, 2022 issued in counterpart application No. PCT/KR2022/002490, 13 pages.

* cited by examiner

ELECTRONIC DEVICE AND OPERATION METHOD OF ELECTRONIC DEVICE PERFORMING CAPTURE FUNCTION

CROSS-REFERENCE TO RELATED APPLICATION(S)

This application is a Bypass Continuation Application of PCT International Application No. PCT/KR/2022/002490, which was filed on Feb. 21, 2022, in the Korean Intellectual Property Office, and claims priority to Korean Patent Application No. 10-2021-0044512, which was filed on Apr. 6, 2021, in the Korean Intellectual Property Office, the content of each of which is incorporated herein by reference.

BACKGROUND

1. Field

This disclosure relates generally to an electronic device for performing a capture function and a method of operating the electronic device and, more specifically, to an electronic device capable of capturing a plurality of screens and a method of operating the electronic device.

2. Description of Related Art

As the number of people who consider health care to be important increases, various information related to exercise and diet are being updated more and more frequently on various platforms. Further, users share their health records on a social networking service (SNS) and communicate with other users.

Users may measure and collect their health data using various electronic devices to manage their health. For example, a wearable device may be mounted on a part of a user's body, such as a wrist, and measure various types of information related to the user's activity, such as a heart rate, motion, stress index, and/or step count, and provide the information to the user. Users may be provided with health-related information using such a wearable device.

However, because a screen size of the wearable device is smaller than that of a smartphone, multiple screens may be configured to provide information on one topic on each screen, and the user may identify information on each screen by performing an operation, such as swiping the screen horizontally, swiping the screen vertically, or rotating a bezel.

Users may store various measured data (e.g., a heart rate, an exercise frequency, an exercise time) for health record storage or capture to share on an SNS.

A capture function provided by the conventional wearable device may encounter a problem in that a capture operation should be performed for each of a plurality of screens. However, performing a capture operation for each of a heart rate screen, an exercise count screen, and an exercise time screen may be inconvenient.

In addition, in the case of capturing information on a plurality of screens, because all information provided by an application is captured, unnecessary information may be included, and separate editing may be required because a very long image may be generated horizontally or vertically.

SUMMARY

The present disclosure has been made to address the above-mentioned problems and disadvantages, and to provide at least the advantages described below.

According to an aspect of the disclosure, an electronic device includes a display; and a processor operatively connected to the display, wherein the processor is configured to receive, from a user, a smart capture request for capturing a plurality of screens including a screen of an application being displayed on the display and a screen of an application not being displayed on the display, to smart capture the plurality of screens according to the request, and to generate a smart capture image based on the plurality of captured screens.

According to another aspect of the disclosure, a method of operating an electronic device includes obtaining, from a user, a smart capture request for capturing a plurality of screens including a screen of an application being displayed on a display and a screen of an application not being displayed on the display; smart capturing the plurality of screens according to the request; and generating a smart capture image based on the plurality of captured screens.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Various embodiments disclosed in this document relate to a smart capture technology that can be provided by a wearable device.

Specifically, an electronic device may perform a smart capture operation capable of capturing a plurality of screens at once. The plurality of screens may include, not only a currently displayed screen, but also an additional application screen configured by an application being displayed.

For example, upon executing smart capture, when an application being displayed is a health care application, an electronic device may capture a "heart rate" screen being displayed on a screen, as well as a "number of motions" screen, and an "exercise time" screen that are not displayed on the screen. The electronic device may be configured to provide information by the application to generate a captured image file.

Further, the electronic device may generate a smart capture image file by excluding unnecessary screens from capture among a plurality of screens configured by an application. For example, the electronic device may not perform a capture operation on a screen including a user's personal information, an unmeasured stress index screen, and an unmeasured step count screen. The electronic device may only capture a necessary screen to generate a smart capture image file.

Because devices with a limited screen size, such as wearable devices, have limited information displayed on a screen, when the device wants to capture information that is not displayed on the screen, then it may be inconvenient to repeat the same capture operation several times. Therefore, technology capable of capturing only necessary information while simultaneously capturing a plurality of screens is necessary for improving user convenience for a wearable device.

Technical problems to be achieved in this document are not limited to the technical problems mentioned above, and other technical problems not mentioned will be clearly understood by those of ordinary skill in the art to which the disclosure belongs.

A user can obtain captured images of a plurality of screens with one operation.

In addition, the user can obtain a captured image of a screen that is not currently being displayed on a display.

Additionally, the user can obtain a captured image excluding personal information, sensitive information, and unnecessary information.

Also, the user can obtain various types of captured images of a plurality of screens.

Further, even when the user intends to utilize an image captured by a wearable device in a terminal, a separate editing operation may be avoided.

Figure 1:
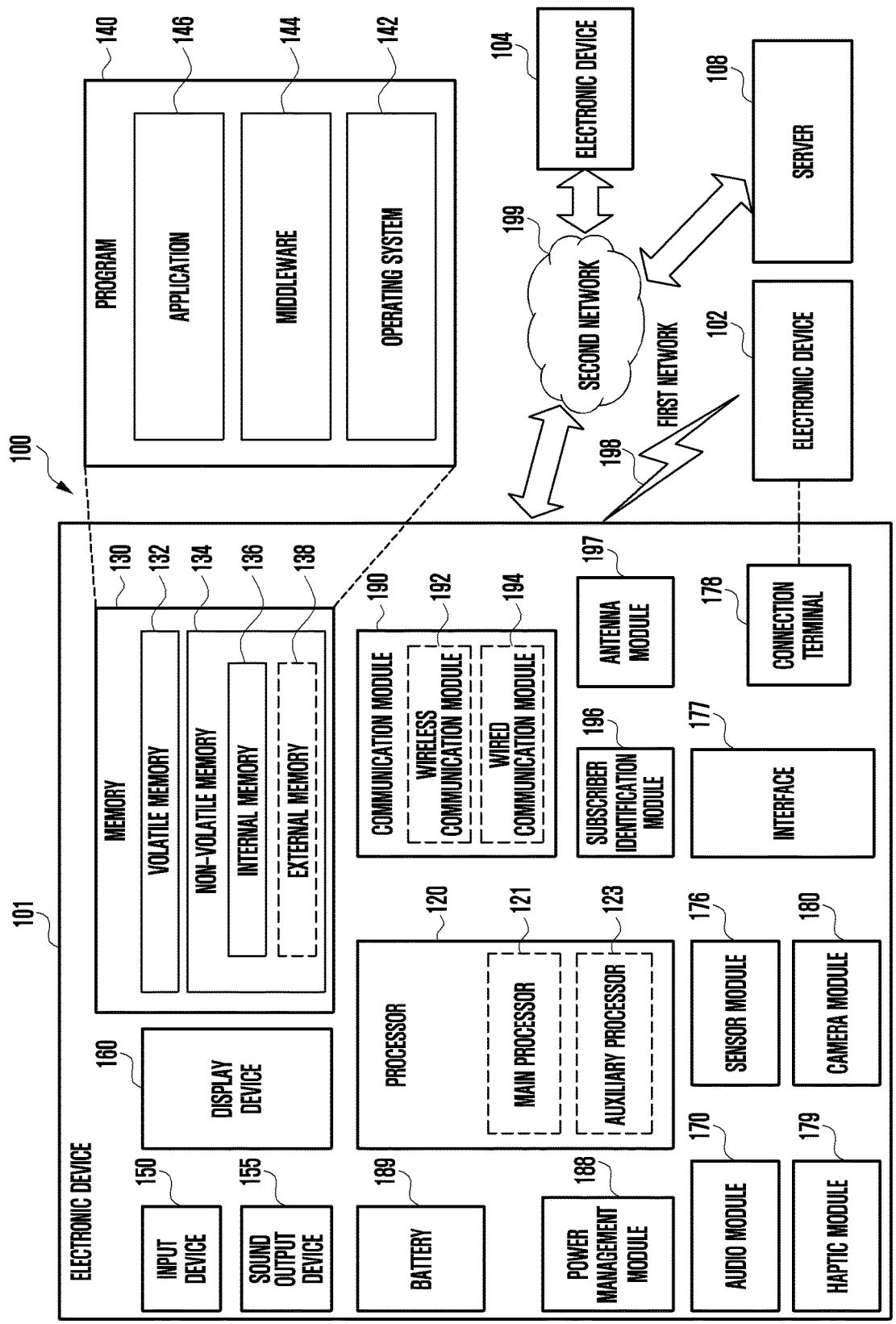
FIG. 1 is a block diagram illustrating an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
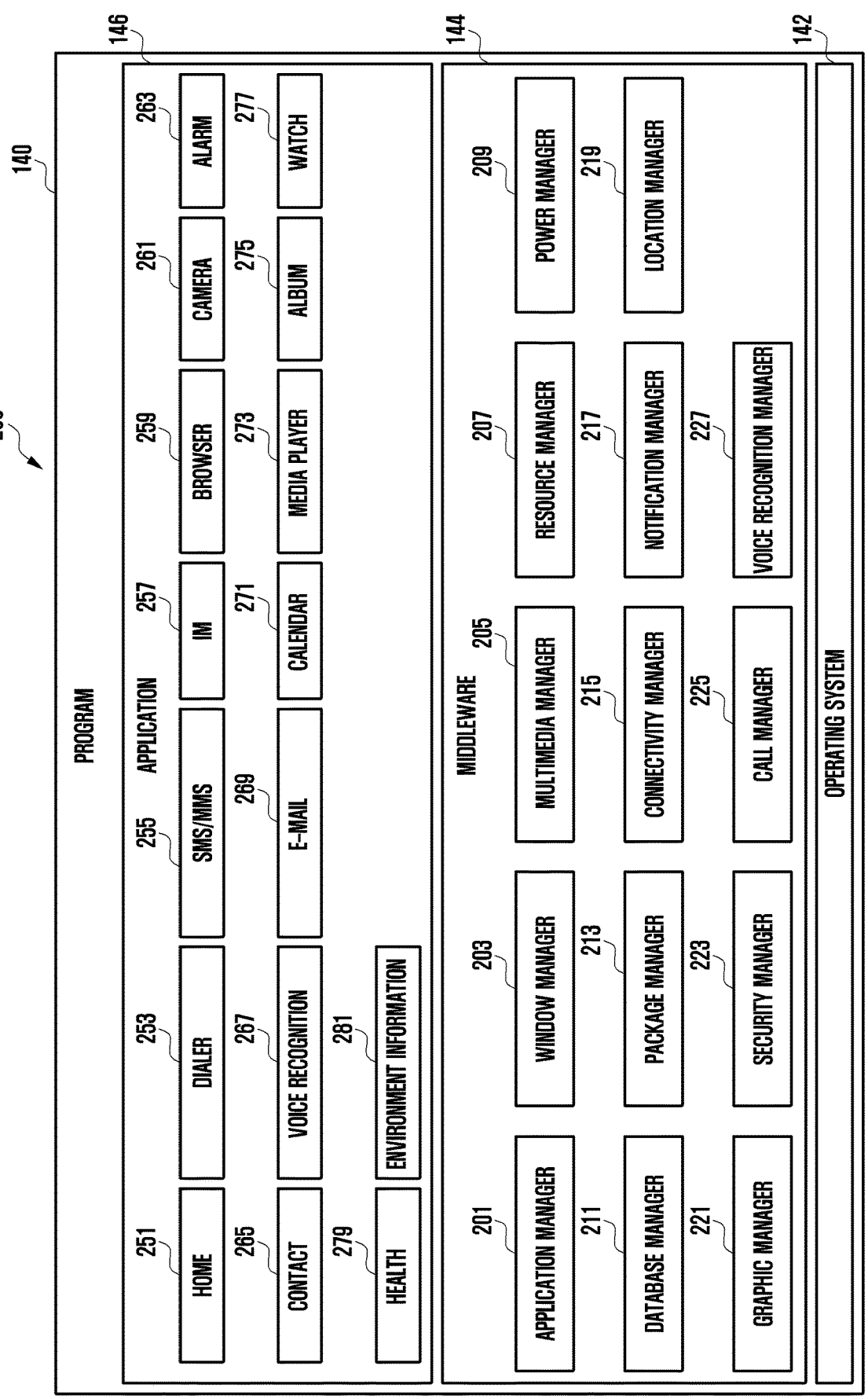
FIG. 2 is a block diagram illustrating a program, according to an embodiment.

FIG. 2 is a block diagram 200 illustrating the program 140, according to an embodiment. According to an embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., a processor, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
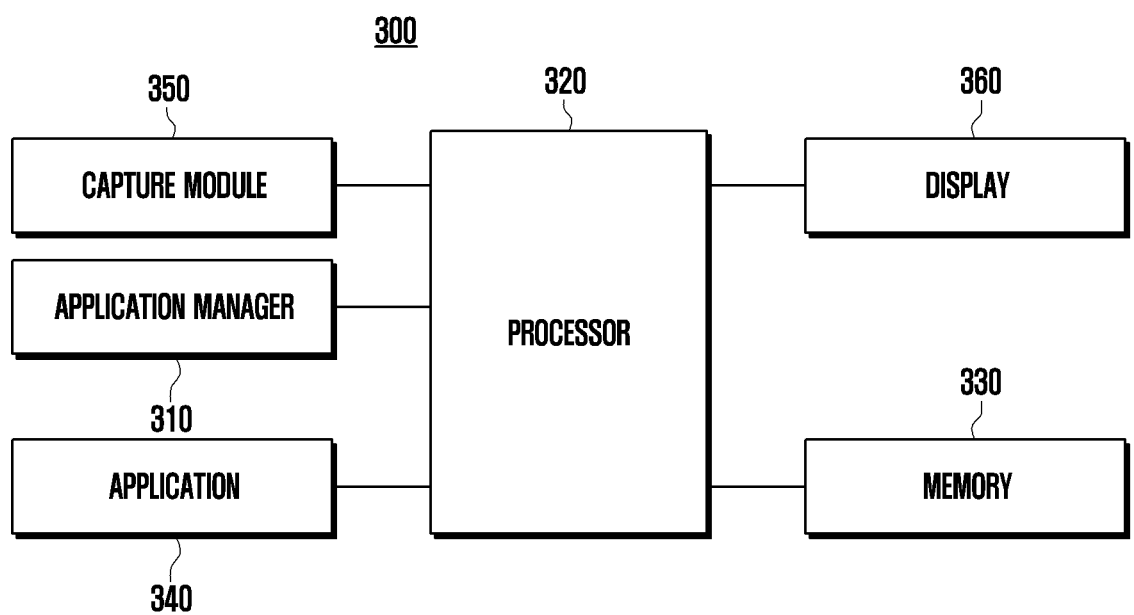
FIG. 3 is a block diagram illustrating an electronic device, according to an embodiment.

FIG. 3 is a block diagram illustrating an electronic device 300, according to an embodiment.

Referring to FIG. 3, an electronic device 300 (e.g., the electronic device 101 of FIG. 1) includes a processor 320 (e.g., the processor 120 of FIG. 1), a display 360 (e.g., the display 160 of FIG. 1), a memory 330 (e.g., the memory 130 of FIG. 1), an application 340, a capture module 350, and/or an application manager 310. The components included in FIG. 3 may include some of the components in the electronic device 300, and the electronic device 300 may include various other components, as illustrated in FIG. 1.

The capture module 350 may mean a software program that captures a screen displayed on a display (e.g., the display 360 of FIG. 3) by the processor 320 and/or a screen not displayed on the display 360. The capture module 350 may provide a function of capturing a screen displayed on the display 360 in a normal capture mode, and provide a function of capturing a screen displayed on the display 360 and a screen not displayed on the display 360 in a smart capture mode. For example, in the smart capture mode of the capture module 350, a function of capturing part or all of a plurality of application screens configured to display information by an application may be provided.

The application 340 may mean various software programs that may be driven by the processor 320 in the electronic device 300. The application 340 may include the application 146 of FIG. 2.

The processor 320 may execute the capture module 350 and/or the application 340 to perform various data processing or operations. Further, the processor 320 may temporarily and/or non-temporarily store data in the memory 330.

The memory 330 may temporarily and/or non-temporarily store a screen captured by the capture module 350. For example, the memory 330 may temporarily store an image of a first screen captured by the capture module 350 while generating a smart capture image. In addition, the memory 330 may non-temporarily store the smart capture image generated by the capture module 350.

The capture module 350 and the application 340 may be included in the memory 330 or may be included in a separate storage space.

Figure 4:
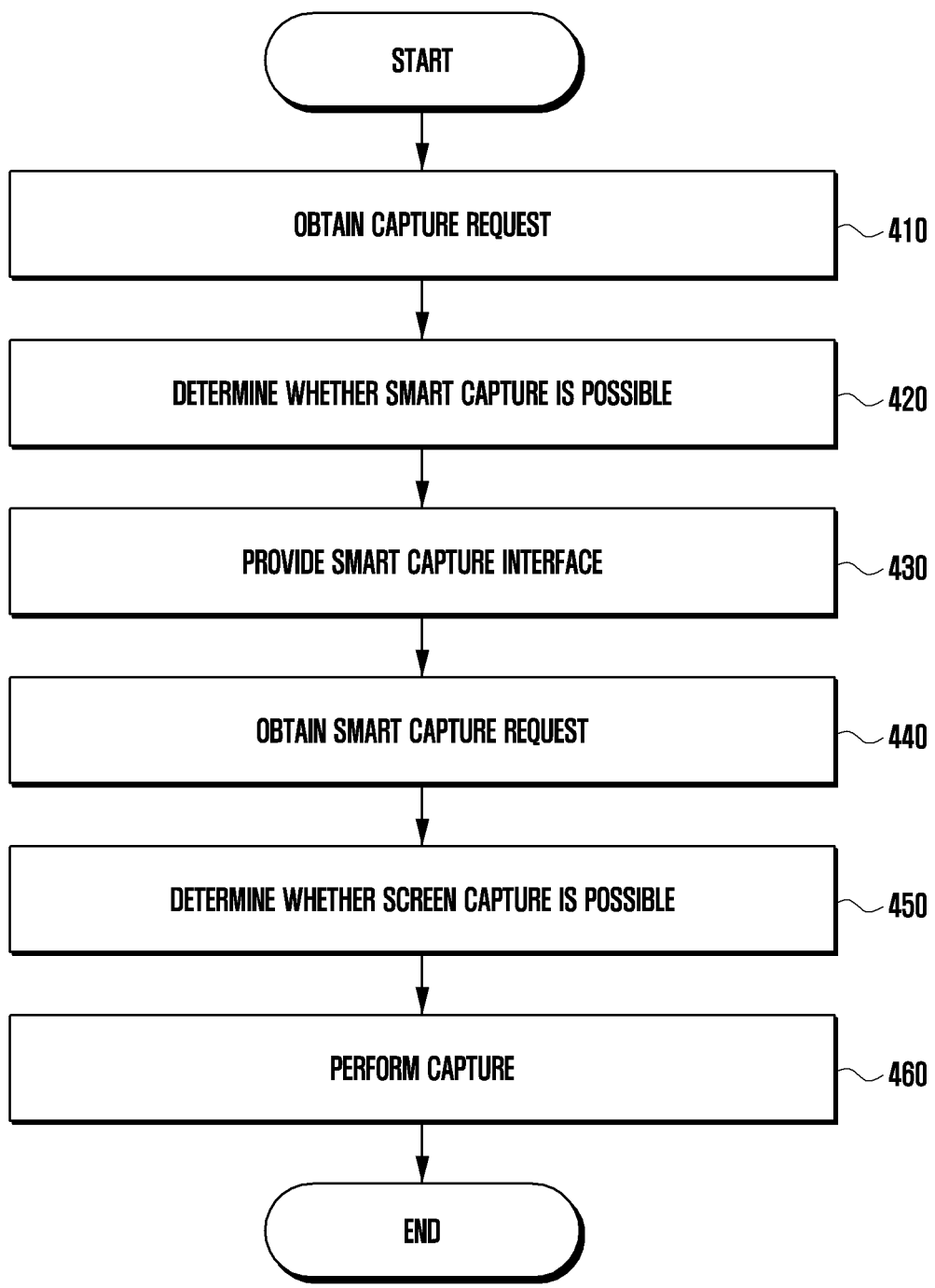
FIG. 4 is a flowchart illustrating a method for a processor to control an electronic device to perform a smart capturing function, according to an embodiment.

FIG. 4 is a flowchart illustrating a method of controlling an electronic device to perform a smart capturing function by a processor (e.g., the processor 320 of FIG. 3) according to an embodiment.

The expression "perform a smart capturing function" may be interchangeably used with, for example, "perform a smart capture" or "perform a smart capture operation". That is, "a smart capture" may be considered to be "a smart capturing function" and/or "a smart capturing operation".

Similarly, the expression "perform an enhanced smart capturing function" may be interchangeably used with, for example, "perform an enhanced smart capture" or "perform an enhanced smart capture operation". That is, "an enhanced smart capture" may be considered to be "an enhanced smart capturing function" and/or "an enhanced smart capturing operation".

Referring to FIG. 4, the processor 320 obtains a capture request in step 410.

The processor 320 may obtain a capture request from the user through a capture button. For example, the capture button may be in the form of hardware, software, a gesture, and/or a combination thereof.

The processor 320 may execute a capture module (e.g., the capture module 350 of FIG. 3) according to a user's capture request. For example, the capture module 350 may mean a software program for causing the processor 320 to capture a screen displayed on a display (e.g., the display 360 of FIG. 3) and/or a screen not displayed on the display 360. The capture module 350 may provide a function of capturing a screen displayed on the display 360 in a normal capture mode, and provide a function of capturing a screen displayed on the display 360 and a screen not displayed on the display 360 in a smart capture mode. For example, in the smart capture mode of the capture module 350, a function of capturing part or all of a plurality of application screens configured to display information by an application may be provided.

The processor 320 determines whether smart capture is possible (e.g., determines whether performing a smart capturing function is possible) in step 420.

Smart capture may mean a capture operation (e.g., a smart capturing function) of capturing a screen displayed on the display 360 and a screen not displayed on the display 360. For example, smart capture may be an operation of capturing part or all of a plurality of application screens configured to display information by an application.

The processor 320 may determine whether smart capture is possible in an application (e.g., the application 340 of FIG. 3). For example, the processor 320 may determine whether smart capture is possible in an application related to a screen being displayed.

The processor 320 may determine whether smart capture is possible according to whether a plurality of application screens exist in the application 340. For example, the processor 320 may determine whether smart capture is possible according to whether the application 340 constitutes an additional application screen in addition to a screen being output on the display 360. In addition, the processor 320 may determine that smart capture is possible when there are a plurality of application screens configured to be displayed on the display 360 by the application 340. For example, when the application 340 is running, the application screen may mean all screens that can be displayed on the display 360 according to a user's input (e.g., a swipe input, scrolling, an air gesture, screen switching according to the user's gaze detection, a rotation of a bezel and/or clicking of a button). Additionally, the application screen may mean all screens configured to display information by the application 340.

The processor 320 may determine whether smart capture is possible according to a size of an application screen configured by the application 340. For example, when a size of an application screen configured in the application 340 is larger than that of the display 360, the processor 320 may determine that smart capture is possible. In addition, when a horizontal and/or vertical length of the application screen configured in the application 340 is longer than a horizontal and/or vertical length of a screen being output on the display 360, the processor 320 may determine that smart capture is possible.

The processor 320 provides a smart capture interface in step 430.

The processor 320 may generate a smart capture interface in the capture module 350 to output the smart capture interface on the display 360 corresponding to smart capture being possible. For example, the smart capture interface may be in the form of an icon including a figure and/or text capable of receiving a user's input. In addition, the processor 320 may provide a smart capture interface that enables a user to request smart capture thereto.

The processor 320 obtains a smart capture request in step 440.

The processor 320 may obtain a smart capture input from the user through the smart capture interface. For example, by touching the smart capture interface, the user may request smart capture.

The processor 320 determines whether performing a screen capture of each application screen is possible in step 450.

The processor 320 may determine whether capture is possible according to whether an application screen is a screen to be excluded in the application 340.

For example, the screen to be excluded may be a screen including a designated type of information. In addition, the designated type of information may include personal information, unmeasured information, and non-public information.

The processor 320 may determine that capture is impossible in the application 340 when a first application screen is a screen to be excluded. In addition, in the application 340, the processor 320 may determine that capture is possible when a first application screen is not a screen to be excluded (is screen to be captured). The processor 320 performs smart capture in step 460.

The processor 320 may capture an application screen determined to be capturable. For example, the processor 320 may perform an operation of capturing the first application screen in the capture module 350 when it is determined that the first application screen can be captured by the application 340. In addition, the processor 320 may temporarily store a captured image of the first application screen in a memory (e.g., the memory 330 of FIG. 3). For example, the processor 320 may not perform an operation of capturing the first application screen in the capture module 350 when it is determined that the first application screen cannot be captured by the application 340.

The processor 320 may generate a smart capture image in the capture module 350 based on a plurality of application screen images temporarily stored in the memory 330.

The processor 320 may generate each of a plurality of application screen images as a separate image file.

The processor 320 may generate an image in which a plurality of application screen images are continuously attached vertically or horizontally as a smart capture image. For example, the capture module 350 may generate an image file in which a first application screen, a second application screen, and a third application screen are connected.

By continuously attaching a plurality of application screen images vertically or horizontally, and filling a blank space between each image with a specified color, the processor 320 may generate a smart capture image. For example, the capture module 350 may generate an image file in which the first application screen, the second application screen, and the third application screen are continuous and in which a blank space between each screen is filled with a specified color.

The processor 320 may generate a smart capture image of a format in which a plurality of application screen images are switched at a specified time (e.g., every n seconds). For example, the capture module 350 may generate an image file of a format (e.g., a graphics interchange format (gif) format) in which the first application screen, the second application screen, and the third application screen are displayed at n second intervals.

The processor 320 may store the generated smart capture image in the memory 330.

The capture module 350 may encrypt and/or decrypt the generated smart capture image based on an encryption key. For example, the capture module 350 may encrypt the generated smart capture image and store the encrypted smart capture image in the memory 330 so that only an authenticated application can access the generated smart capture image. In addition, the capture module 350 may decrypt the encrypted smart capture image stored in the memory 330 and provide the decrypted smart capture image to the authenticated application corresponding to the authenticated application requesting the smart capture image.

Figure 5A:
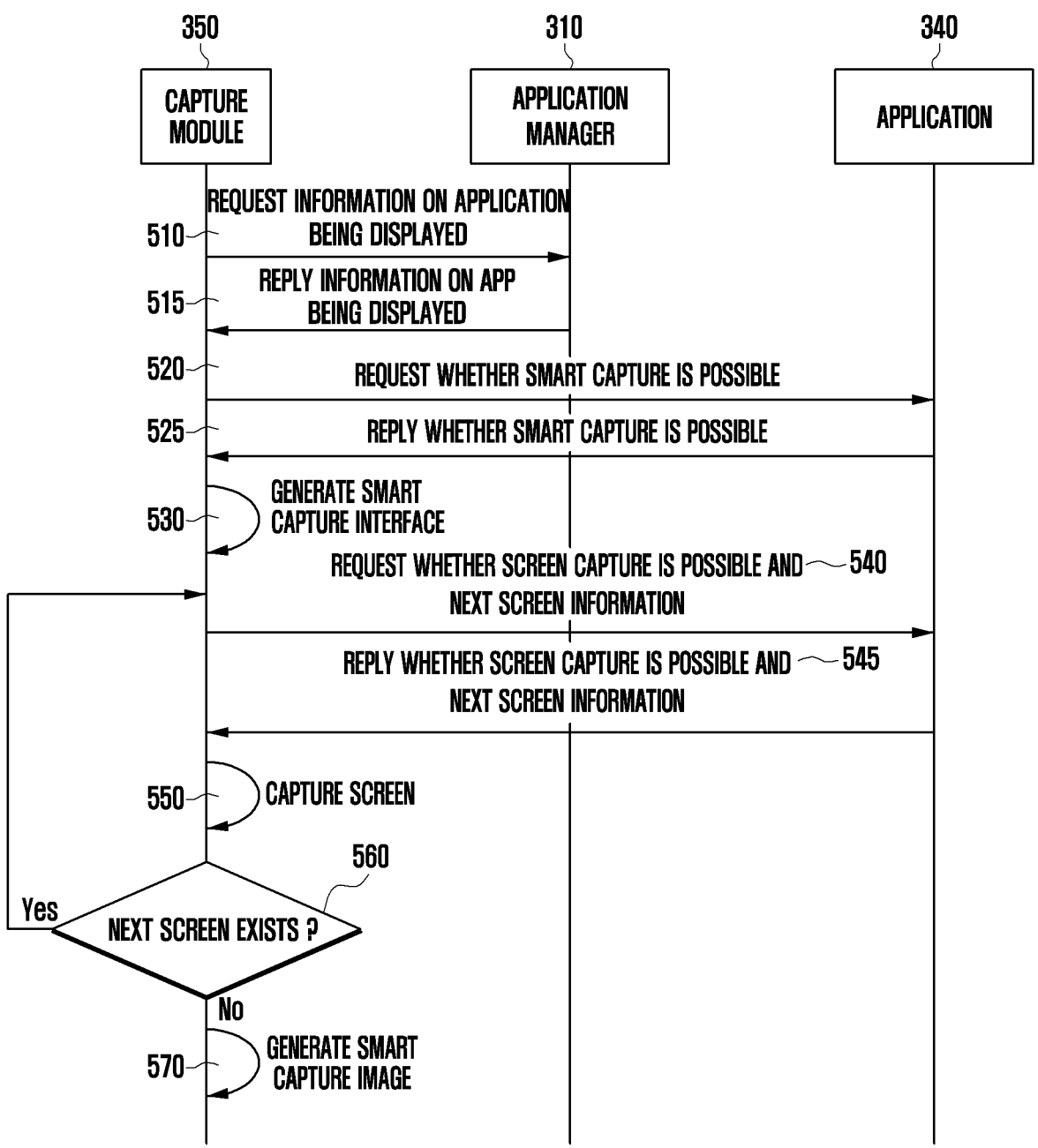
FIGS. 5A and 5B are message flow diagrams illustrating operations between a capture module, a manager, and an application, according to various embodiments.
Figure 5B:
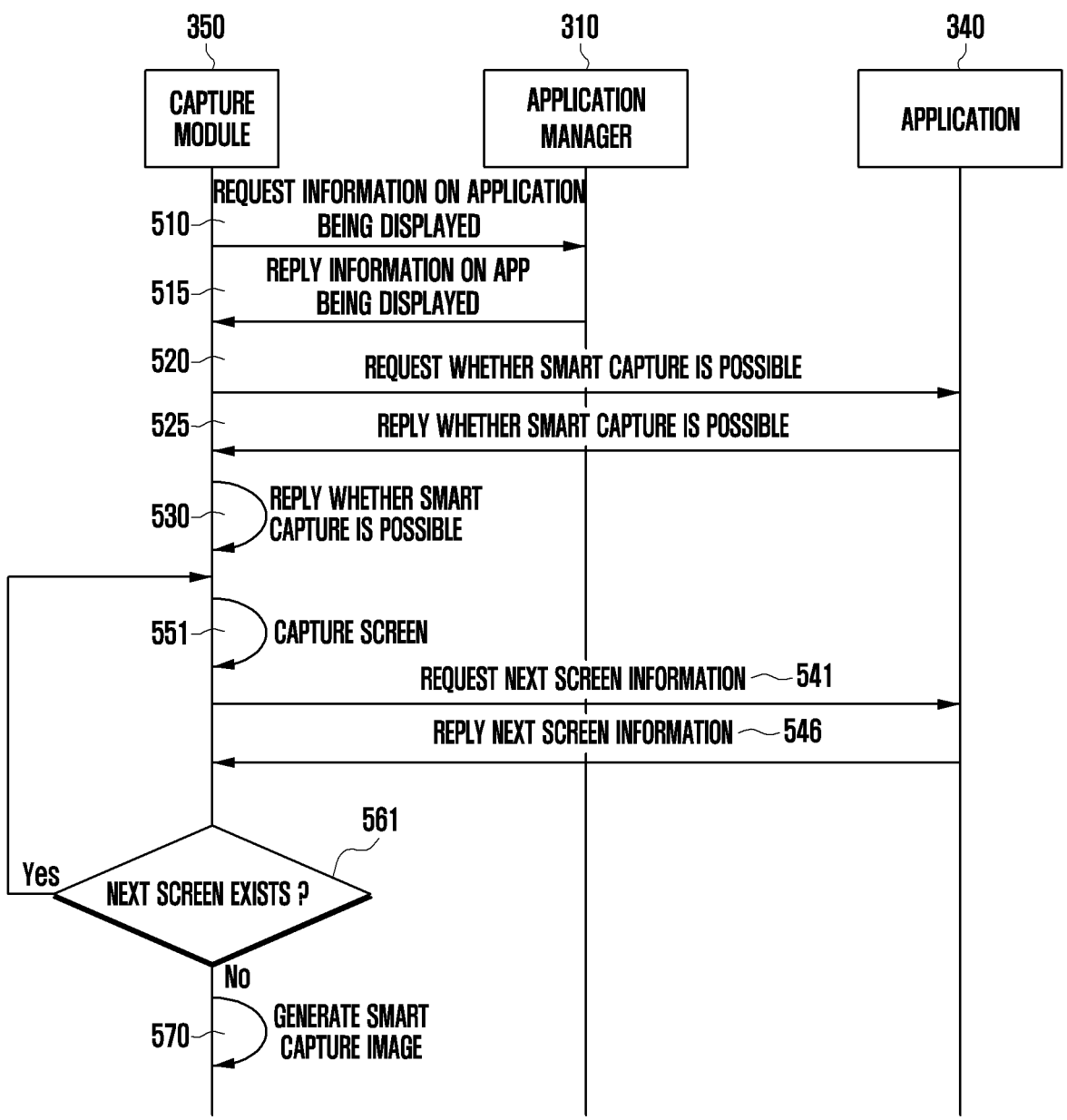

FIGS. 5A and 5B are diagrams illustrating operations between a capture module 350, an application manager 310, and an application 340, according to an embodiment.

FIG. 5A is a message flow diagram illustrating an operation between the capture module 350, the application manager 310, and the application 340 in a state in which an enhanced smart mode is activated, and FIG. 5B is a diagram illustrating an operation between the capture module 350, the application manager 310, and the application 340 in a state in which an enhanced smart mode is deactivated.

Smart capture may mean a capture operation of capturing a screen displayed on the display 360 and a screen not displayed on the display 360. For example, smart capture may be an operation of capturing part or all of a plurality of application screens configured to display information by an application.

An enhanced smart capturing function mode may mean a mode of generating a smart capture image by excluding unnecessary screens (excluded screens) among a plurality of screens and capturing only necessary screens. For example, the unnecessary screen may be a screen including a designated type of information, and the designated type of information may be determined by the application 340. A designated type of information may include personal information, unmeasured information, and/or non-public information.

Figure 8A:
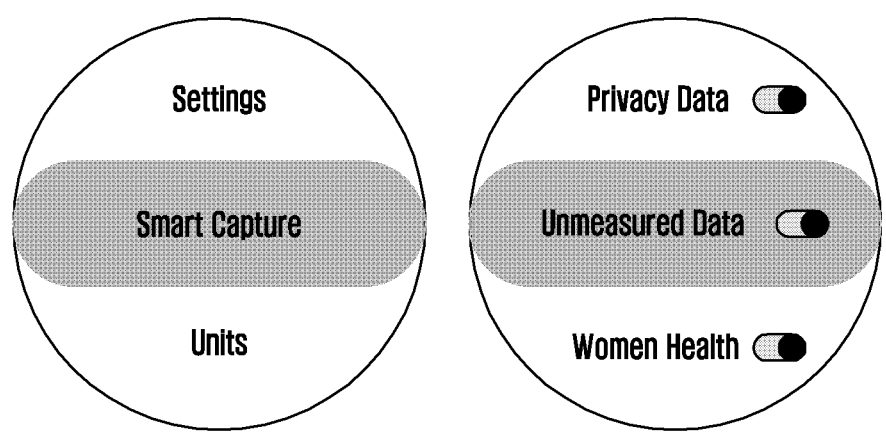
FIGS. 8A, 8B, 8C, 8D, and 8E are diagrams illustrating examples of an enhanced smart capturing function, according to various embodiments.

The enhanced smart capturing function mode may be activated or deactivated by a user input to configure a setting related to the capture module 350, as illustrated in FIG. 8A.

The capture module 350 may mean a software program for capturing a screen displayed on a display (e.g., the display 360 of FIG. 3) and/or a screen not displayed on the display 360. The capture module 350 may provide a function of capturing a screen displayed on the display 360 in a normal capture mode, and provide a function of capturing a screen displayed on the display 360 and a screen not displayed on the display 360 in a smart capture mode. For example, in the smart capture mode of the capture module 350, a function of capturing part or all of a plurality of application screens configured to display information by an application may be provided.

The application 340 may mean various software programs that may be run in the electronic device 300. The application 340 may include the application 146 of FIG. 2.

The application manager 310 may manage an application of the electronic device 200 and include information on the application.

The capture module 350, the application manager 310, and the application 340 may be run on a processor (e.g., the processor 330 of FIG. 3).

FIG. 5A is a flowchart illustrating an operation between the capture module 350, the application manager 310, and the application 340 in a state in which an enhanced smart mode is activated, according to an embodiment.

The processor 320 may execute the capture module 350 according to a user's capture request. For example, the processor 320 may obtain a capture request from the user through a capture button. The capture button may be in the form of hardware, software, a gesture, and/or a combination thereof.

Referring to FIG. 5A, the capture module 350 requests information on an application being displayed to the application manager 310 in step 510.

The capture module 350 may request information on an application related to a screen being output on the display (e.g., the display 360 of FIG. 3) to the application manager 310.

The application manager 310 replies with information on an application being displayed to the capture module 350 in step 515.

The information on the application being displayed is information related to an application related to a screen being output on the display 360 when a capture request is obtained from the user, and may include information capable of identifying the application.

The capture module 350 requests whether smart capture is possible to the application 340 in step 520.

The capture module 350 may request whether smart capture is possible to the corresponding application 340 based on information on an application being displayed that is replied from the application manager 310.

The application 340 replies to the capture module 350 with information indicating whether smart capture is possible in step 525.

The application 340 may determine whether smart capture is possible.

The application 340 may determine whether smart capture is possible according to whether a plurality of application screens exist. For example, the application 340 may determine whether smart capture is possible according to whether an additional application screen is configured in addition to a screen being output on the display 360. When there are a plurality of application screens configured to be displayed on the display 360, the application 340 may determine that smart capture is possible. When the application 340 is running, the application screen may mean all screens that can be displayed on the display 360 according to a user's input (e.g., a swipe input, scrolling, an air gesture, screen switching according to the user's gaze detection, a rotation of a bezel, and/or a clicking of a button). In addition, the application screen may mean all screens configured to display information by the application 340.

The capture module 350 generates a smart capture interface in step 530.

The capture module 350 may generate a smart capture interface and output the smart capture interface on the display 360. For example, the smart capture interface may be in the form of an icon including a figure and/or text capable of receiving a user's input. The capture module 350 may provide a smart capture interface that enables a user to request smart capture (e.g., request a smart capturing function).

The capture module 350 may obtain a smart capture input from the user through a smart capture interface. For example, by touching the smart capture interface, the user may request a smart capture function.

The capture module 350 requests, to the application 340, information indicating whether performing a screen capture is possible and whether next screen information exists in step 540.

The capture module 350 may request information indicating whether performing a screen capture is possible and whether next screen information exists to the application 340 when the enhanced smart capture mode is activated. For example, the capture module 350 may request whether a first application screen can be captured, that is, the capture module 350 may request whether the first application screen is a screen including designated information to be excluded. Further, the capture module 350 may request whether a second application screen exists among a plurality of application screens configured by the application 340.

The application 340 replies with information indicating whether performing a screen capture is possible and whether next screen information exists to the capture module 350 in step 545.

The application 340 may determine whether capture is possible according to whether the first application screen is a screen including designated information to be excluded.

For example, a designated type of information to be excluded may include personal information, unmeasured information, and non-public information.

The application 340 may determine that capture is impossible when the first application screen is a screen to be excluded. The application 340 may determine that capture is possible when the first application screen is not a screen to be excluded (a screen to be captured). The application 340 may reply to the capture module 350 with information indicating whether the first application screen can be captured.

The application 340 may provide information, to the capture module 350, on whether a next screen (e.g., a second application screen) exists. For example, the application 340 may provide information indicating that the second application screen exists to the capture module 350 when the second application screen is configured by the application 340 among the plurality of application screens. The application 340 may provide, to the capture module 350, information that the next screen does not exist when the second application screen is absent among the plurality of screens configured by the application 340.

The capture module 350 captures a screen in step 550.

The capture module 350 may capture the first application screen according to information indicating whether the first application screen can be captured that is replied from the application 340. For example, the capture module 350 may capture the first application screen when information indicating that the first application screen can be captured is received from the application 340. The capture module 350 may temporarily store an image in which the first application screen is captured in a memory 330. In addition, the capture module 350 may not capture the first application screen when information that the first application screen cannot be captured is received from the application 340.

The capture module 350 identifies whether a next screen to be captured exists in step 560.

The capture module 350 re-performs step 540 when information that a next screen (e.g., second application screen) exists is received from the application 340. For example, the capture module 350 may request, to the application 340, information indicating whether the second application screen can be captured and whether a next screen (e.g., a third application screen) exists.

The capture module 350 performs step 570 when information that a next screen does not exist is received from the application 340. For example, the capture module 350 may generate a smart capture image without capturing an application screen anymore.

The capture module 350 generates a smart capture image in step 570.

The capture module 350 may generate a smart capture image based on a plurality of application screen images temporarily stored in the memory 330.

The capture module 350 may generate each of a plurality of application screen images as a separate image file.

The capture module 350 may generate an image in which a plurality of application screen images are continuously attached vertically or horizontally as a smart capture image. For example, the capture module 350 may generate an image file in which a first application screen, a second application screen, and a third application screen are continuous.

By continuously attaching a plurality of application screen images vertically or horizontally and filling a blank space between each image with a specified color, the capture module 350 may generate a smart capture image. For example, the capture module 350 may generate an image file in which a first application screen, a second application screen, and a third application screen are continuous and in which a blank space between each screen is filled with a specified color.

The capture module 350 may generate a smart capture image of a format in which a plurality of application screen images are switched at designated time intervals (e.g., every n seconds). For example, the capture module 350 may generate an image file of a format (e.g., a GIF format) in which a first application screen, a second application screen, and a third application screen are displayed at n second intervals.

The capture module 350 may store the generated smart capture image in the memory 330.

The capture module 350 may encrypt and/or decrypt the generated smart capture image based on an encryption key. For example, the capture module 350 may encrypt the generated smart capture image and store the encrypted smart capture image in the memory 330 so that only an authenticated application can access the generated smart capture image. The capture module 350 may decrypt the encrypted smart capture image stored in the memory 330 and provide the decrypted smart capture image to the authenticated application corresponding to the authenticated application requesting the smart capture image.

FIG. 5B is a flowchart illustrating an operation between the capture module 350, the application manager 310, and the application 340 in a state in which an enhanced smart capture mode is deactivated, according to an embodiment.

Because a description of steps 510 to 530 may be the same as that of FIG. 5A, the descriptions thereof will be omitted.

Referring to FIG. 5B, the capture module 350 captures a screen in step 551.

The capture module 350 may capture a first application screen of the application 340. For example, the capture module 350 may temporarily store an image in which the first application screen is captured in the memory 330.

The capture module 350 requests, to the application 340, next screen information in step 541.

The capture module 350 may request, to the application 340, information on the next screen (e.g., the second screen) when an enhanced smart capture mode is deactivated. For example, the capture module 350 may request information indicating whether a second application screen exists among a plurality of application screens configured by the application 340.

The application 340 replies, to the capture module 350, with the next screen information in step 546.

The application 340 may provide information, to the capture module 350, on whether a next screen (e.g., a second application screen) exists. For example, the application 340 may provide information that the second application screen exists to the capture module 350 when the second application screen is configured among the plurality of application screens configured by the application 340. For example, the application 340 may provide, to the capture module 250, information indicating that the next screen does not exist when the second application screen is absent among the plurality of screens configured by the application 340.

The capture module 350 identifies whether a next screen to be captured exists in step 561.

The capture module 350 re-performs step 551 when information that a next screen (e.g., a second application screen) exists is received from the application 340. For example, the capture module 350 may capture the second application screen.

The capture module 350 performs step 570 when information that the next screen does not exist is received from the application 340. For example, the capture module 350 may generate a smart capture image without capturing an application screen.

The capture module 350 generates a smart capture image in step 570.

The capture module 350 may generate a smart capture image based on a plurality of application screen images temporarily stored in the memory 330.

The capture module 350 may generate a smart capture image based on a plurality of application screen images temporarily stored in the memory 330.

The capture module 350 may generate each of a plurality of application screen images as a separate image file.

The capture module 350 may generate an image in which a plurality of application screen images are continuously attached vertically or horizontally as a smart capture image. For example, the capture module 350 may generate an image file in which a first application screen, a second application screen, and a third application screen are connected.

By continuously attaching a plurality of application screen images vertically or horizontally and filling a blank space between each image with a specified color, the capture module 350 may generate a smart capture image. For example, the capture module 350 may generate an image file in which the first application screen, the second application screen, and the third application screen are continuous and in which a blank space between each screen is filled with a specified color.

The capture module 350 may generate a smart capture image of a format in which a plurality of application screen images are switched at designated time intervals (e.g., n seconds). For example, the capture module 350 may generate an image file of a format (e.g., a GIF format) in which the first application screen, the second application screen, and the third application screen are displayed at n second intervals.

The capture module 350 may store the generated smart capture image in the memory 330.

The capture module 350 may encrypt and/or decrypt the generated smart capture image based on the encryption key. For example, the capture module 350 may encrypt the generated smart capture image and store the encrypted smart capture image in the memory 330 so that only an authenticated application may access the generated smart capture image. The capture module 350 may decrypt the encrypted smart capture image stored in the memory 330 and provide the decrypted smart capture image to the authenticated application corresponding to the authenticated application requesting the smart capture image.

Figure 6A:
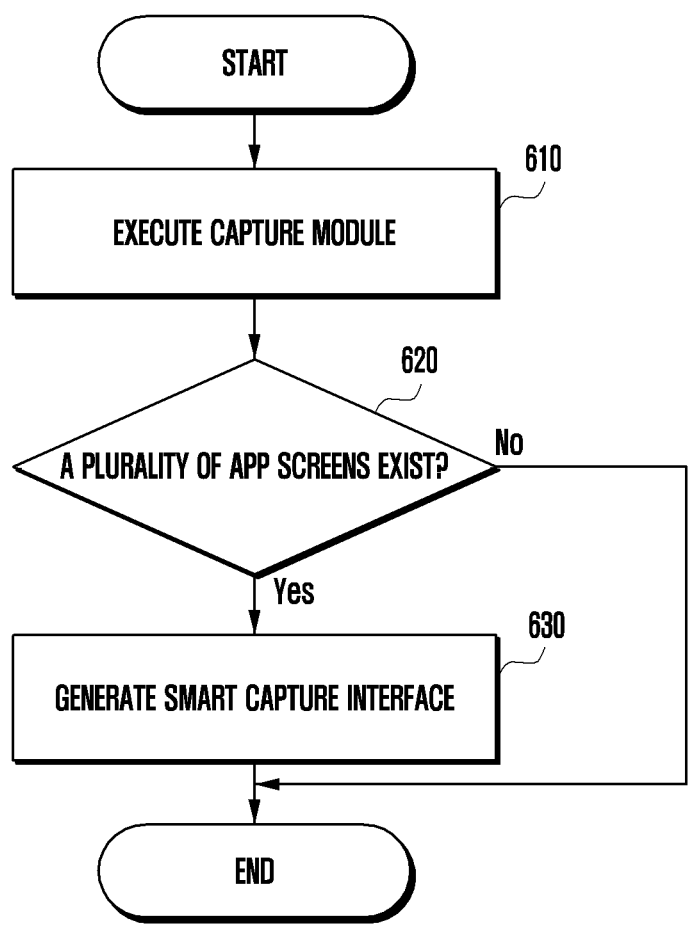
FIG. 6A is a flowchart illustrating an operation for a processor to generate a smart capture interface, according to an embodiment.

FIG. 6A is a flowchart illustrating an operation for generating a smart capture interface by a processor (e.g., the processor 320 of FIG. 3) according to an embodiment.

Referring to FIG. 6A, the processor 320 executes a capture module (e.g., the capture module 350 of FIG. 3) in step 610.

The processor 320 may execute the capture module 350 according to a user's capture request. For example, the processor 320 may obtain a capture request from the user through a capture button. The capture button may be in the form of hardware, software, and/or a combination thereof.

The processor 320 identifies whether a plurality of application screens exist in step 620.

The processor 320 may identify whether a plurality of application screens exist in the application (e.g., the application 340 of FIG. 3). For example, the processor 320 may identify whether the application 340 constitutes an additional application screen in addition to a screen being output on the display 360. The processor 320 may identify whether there are a plurality of application screens configured to be displayed on the display 360 by the application 340. The application screen may mean all screens that can be displayed on the display 360 according to the user's input (e.g., a swipe input, scrolling, an air gesture, screen switching according to the user's gaze detection, a rotation of a bezel and/or a clicking of a button) when the application 340 is running. The application screen may mean all screens configured to display information by the application 340.

If the plurality of application screens do not exist (e.g., No in step 620), the processor 320 ends an operation without generating a smart capture interface.

If a plurality of application screens exist (e.g., Yes in step 620), the processor 320 generates a smart capture interface in step 630.

The processor 320 may generate a smart capture interface in the capture module 350 to output the smart capture interface to the display 360. For example, the smart capture interface may be in the form of an icon including a figure and/or text capable of receiving a user's input. The processor 320 may provide a smart capture interface that enables a user to request smart capture thereto.

Figure 6B:
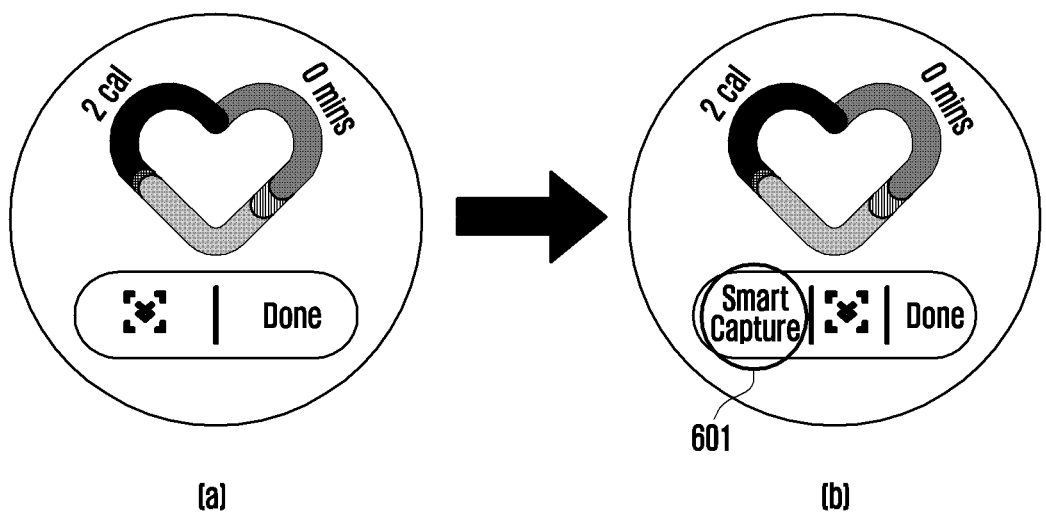
FIG. 6B is a diagram illustrating an example of a smart capture interface generated by a processor, according to an embodiment.

FIG. 6B is a diagram illustrating an example of a smart capture interface generated by the processor 320, according to an embodiment.

The processor 320 may generate a smart capture interface in the capture module 350 and output the smart capture interface on the display 360 in step 630 when it is determined that smart capture is possible in the application 340 (e.g., identifying that a plurality of application screens exist).

(a) of FIG. 6B is an example of a normal capture interface, and (b) of FIG. 6B is an example of a smart capture interface.

The processor 320 may output a normal capture interface on the display 360, as illustrated in (a) of FIG. 6B, when it is determined that performing a smart capturing function is not possible (e.g., No in step 620 of FIG. 6A).

The processor 320 may output a smart capture interface on the display 360, as illustrated in (b) of FIG. 6B, when it is determined that performing a smart capturing function is possible (e.g., Yes in step 620 of FIG. 6A). The smart capture interface may include a smart capture button 601, and the processor 320 may perform a smart capture operation (e.g., steps 540 to 570 of FIG. 5A) corresponding to the user touching the smart capture button 610.

Figure 7:
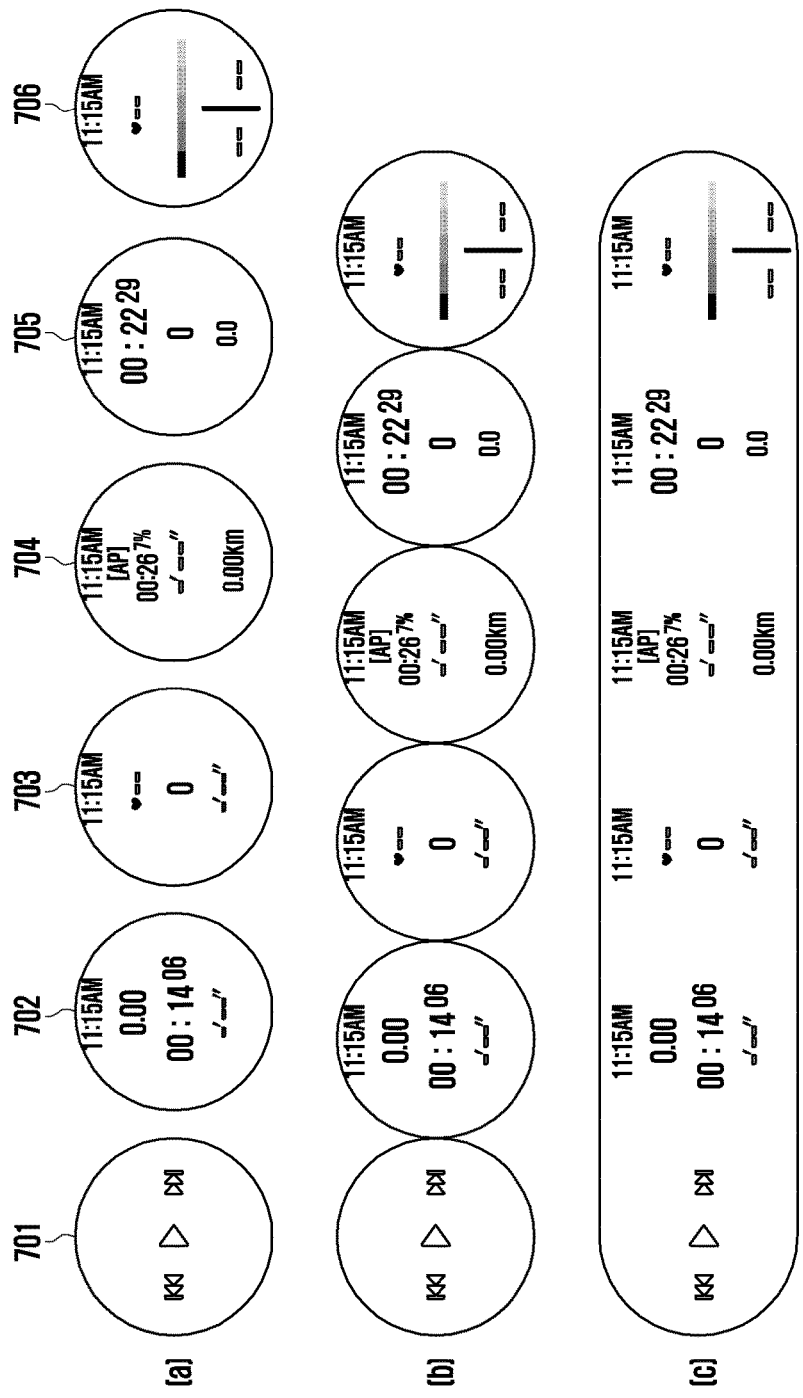
FIG. 7 is a diagram illustrating an example of a smart capture image generated by a processor, according to an embodiment.
Figure 7:
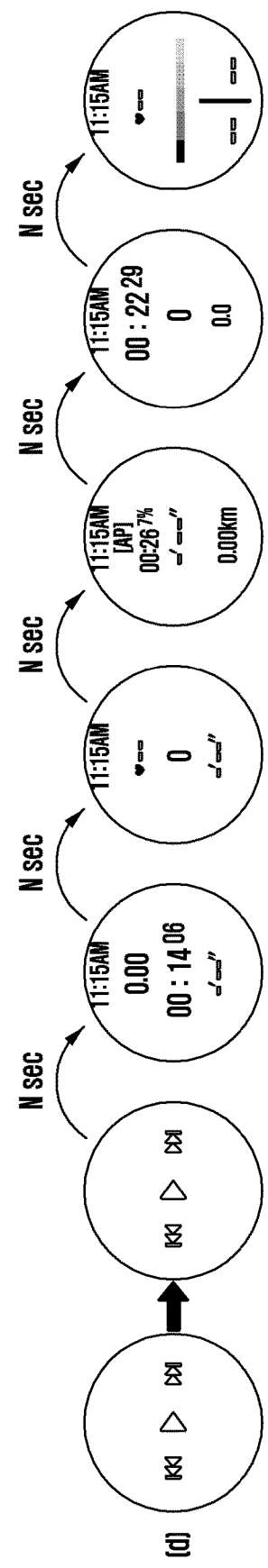

FIG. 7 is a diagram illustrating an example of a smart capture image generated by a processor (e.g., the processor 320 of FIG. 3) according to an embodiment.

The processor 320 may generate a smart capture image based on a plurality of captured screens.

The processor 320 may generate various types of smart capture images in the capture module 350 based on a plurality of application screen images temporarily stored in the memory (e.g., the memory 330 of FIG. 3).

Referring to FIG. 7, the processor 320 may generate a smart capture image based on a first application screen 701, a second application screen 702, a third application screen 703, a fourth application screen 704, a fifth application screen 705, a sixth application screen 706, and/or a sixth application screen 706 temporarily stored in the memory 330.

Referring to (a) of FIG. 7, the processor 320 may generate images of the first application screen 701 to the sixth application screen 706 as separate image files.

Referring to (b) FIG. 7, the processor 320 may generate a smart capture image by continuously attaching images of the first application screen 701 to the sixth application screen 706 vertically or horizontally. For example, the processor 320 may generate an image file in which the first application screen 701 to the sixth application screen 706 are connected.

Referring to (c) of FIG. 7, by continuously attaching images of the first application screen 701 to the sixth application screen 706, vertically or horizontally, and filling a blank space between each screen image with a specified color, the processor 320 may generate a smart capture image. For example, the processor 320 may generate an image file in which the first application screen 701 to the sixth application screen 706 are continuous and in which a blank space between each screen is filled with a specified color (e.g., a color similar to the background color of each screen).

Referring to (d) of FIG. 7, the processor 320 may generate a smart capture image in the form of switching the images of the first application screen 701 to the sixth application screen 706 every specified time (e.g., n seconds). For example, the processor 320 may generate an image file of a format (e.g., a GIF format) in which each of the first application screen 701, the second application screen 702, the third application screen 703, the fourth application screen 704, the fifth application screen 705, and the sixth application screen 706 are displayed at intervals of n seconds.

The processor 320 may store the generated smart capture image in the memory (e.g., the memory 330 of FIG. 3).

FIG. 8A is a diagram illustrating an example of a smart capture setting screen, according to an embodiment.

The processor 320 may provide an option for setting whether to activate an enhanced smart capture mode in settings related to the capture module 350.

The enhanced smart capture mode may mean a mode of generating a smart capture image by capturing only necessary screens, and not unnecessary screens, among a plurality of screens. The unnecessary screen may be a screen including a designated type of information, and the designated type of information may be determined by the application 340. The designated type of information may include personal information, unmeasured information, and/or non-public information.

Therefore, in the enhanced smart capture mode, the processor 320 may not capture a screen to be excluded (e.g., a screen to be excluded 820 of FIG. 8C) including the designated type of information, and may capture only a screen to be captured (e.g., a screen to be captured 810 of FIG. 8C) that does not include the designated type of information.

Figure 8B:
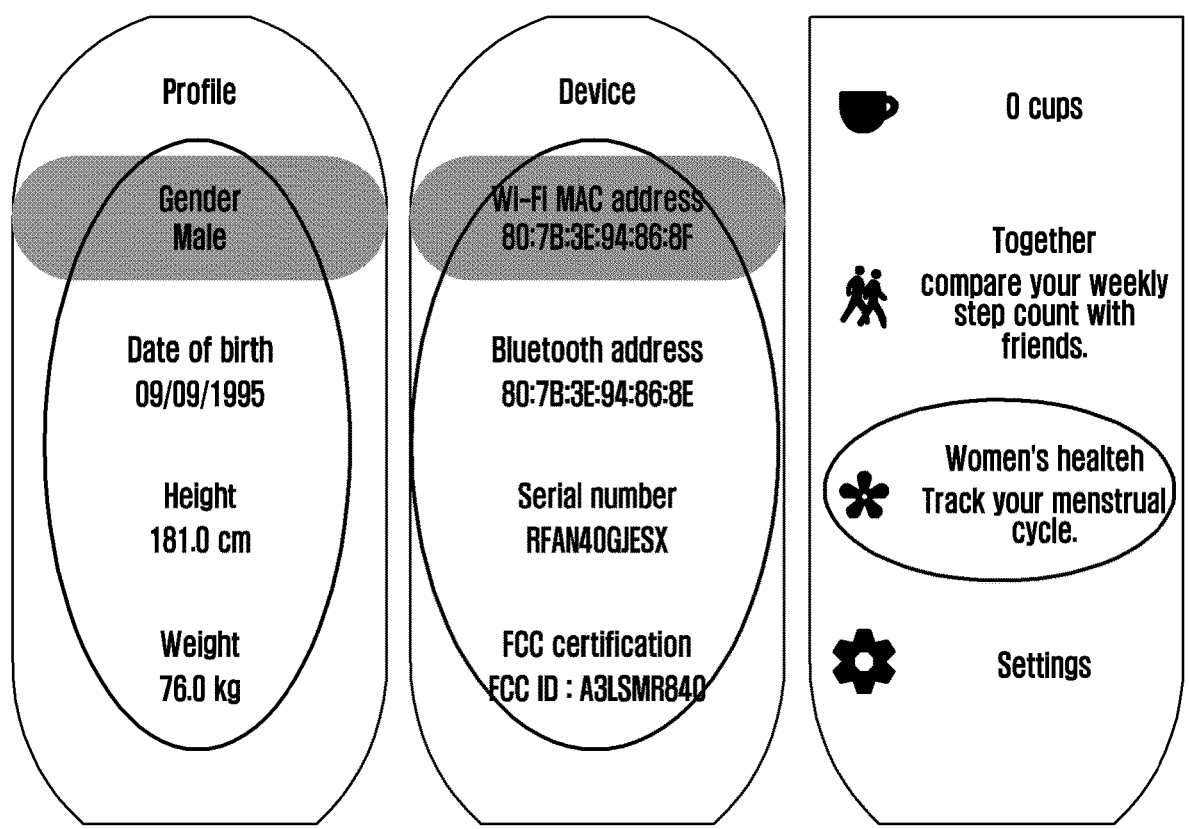

FIG. 8B is a diagram illustrating an example of a screen to be excluded when a processor (e.g., the processor 320 of FIG. 3) performs an enhanced smart capturing function, according to an embodiment.

Referring to FIG. 8B, a screen to be excluded 820 may be a screen including personal information (e.g., gender, date of birth, height, and/or weight), device information (e.g., a Wi-Fi mac address), a Bluetooth™ address, a serial number, the Federal Communications Commission (FCC) certification, and/or other non-public information (e.g., women's health information).

By capturing a screen other than the screen to be excluded 820 in an enhanced smart capture mode, the processor 320 may provide a captured image, except for the above unnecessary and/or sensitive information to the user.

Figure 8C:
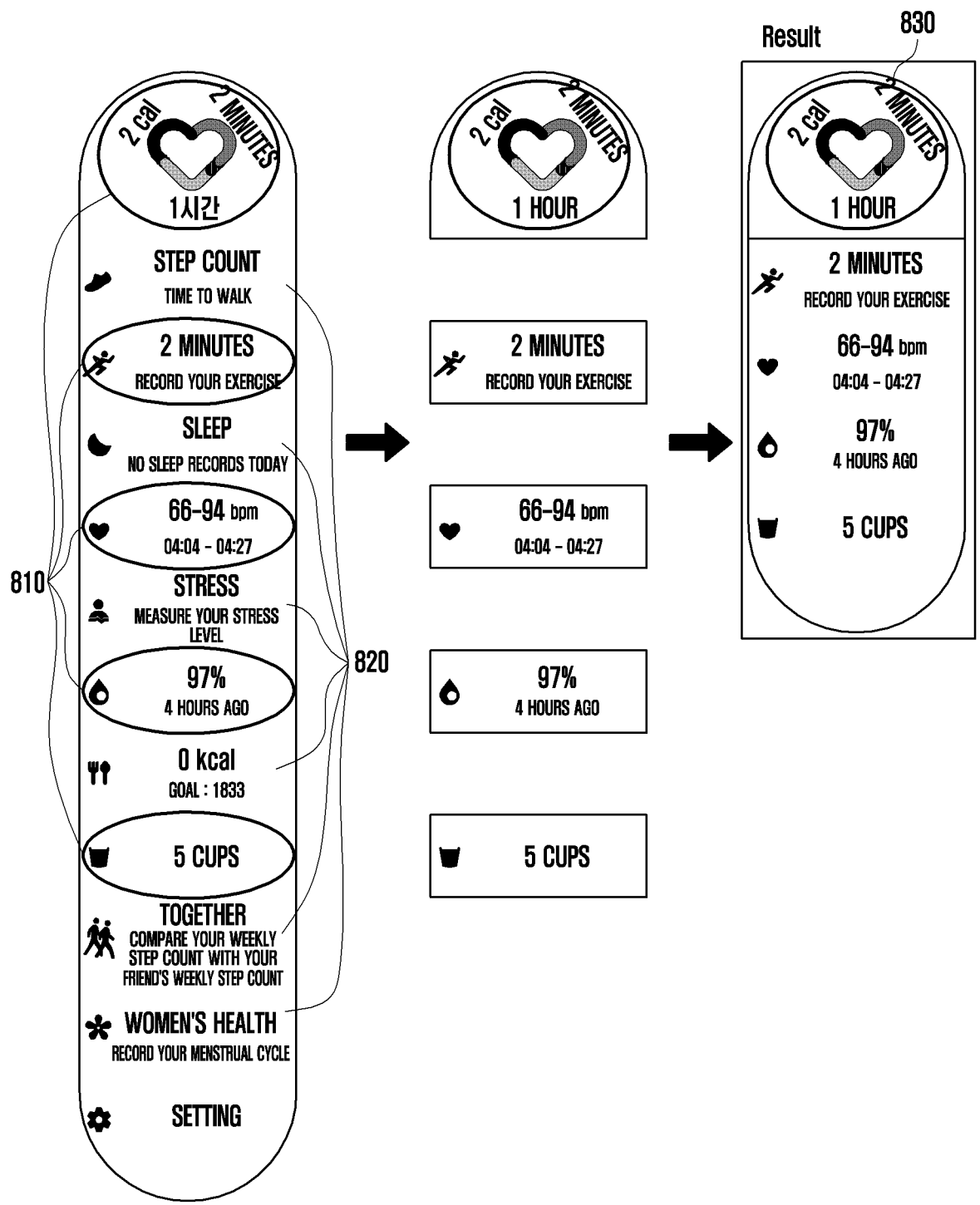
Figure 8D:
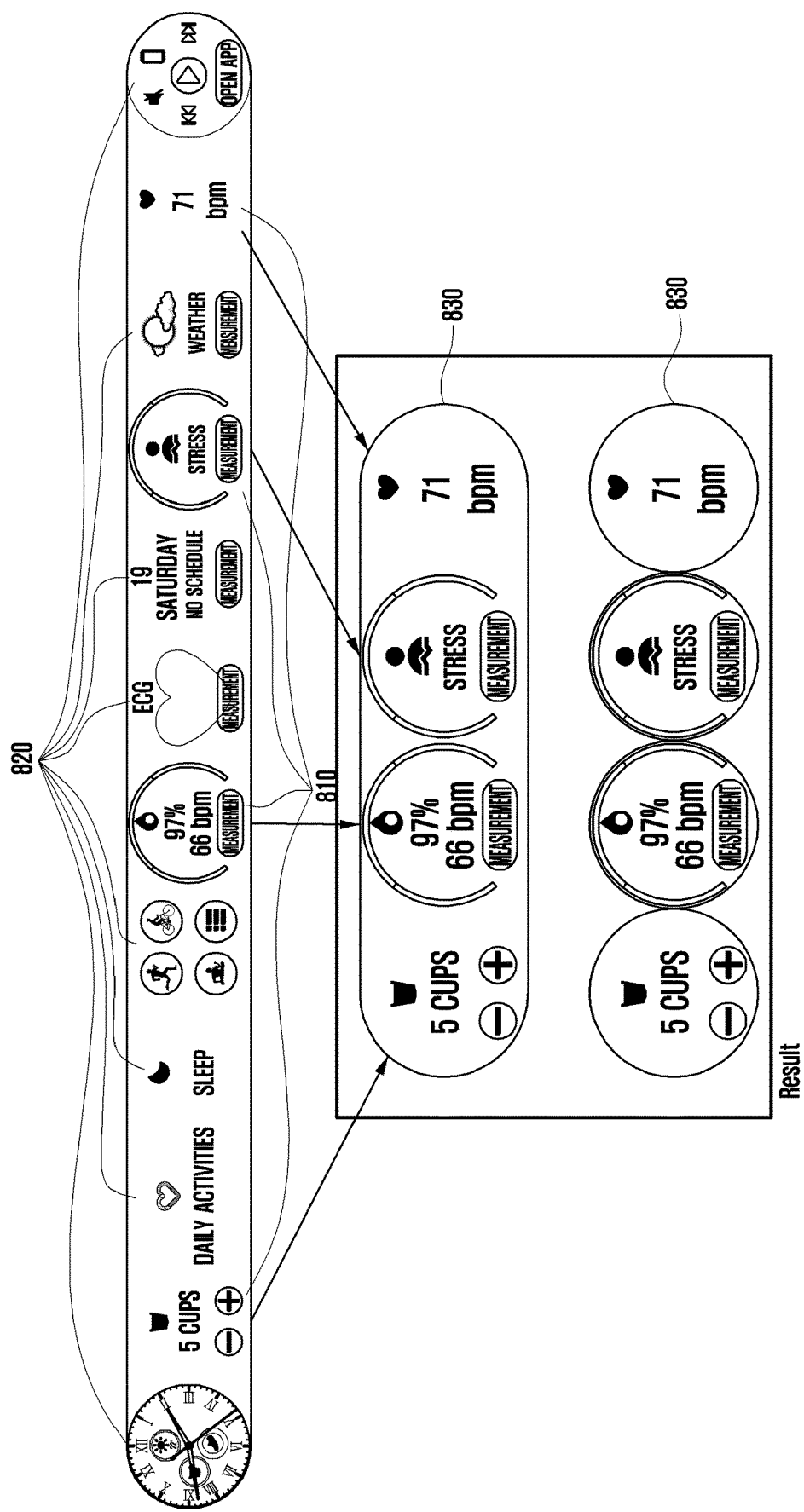
Figure 8E:
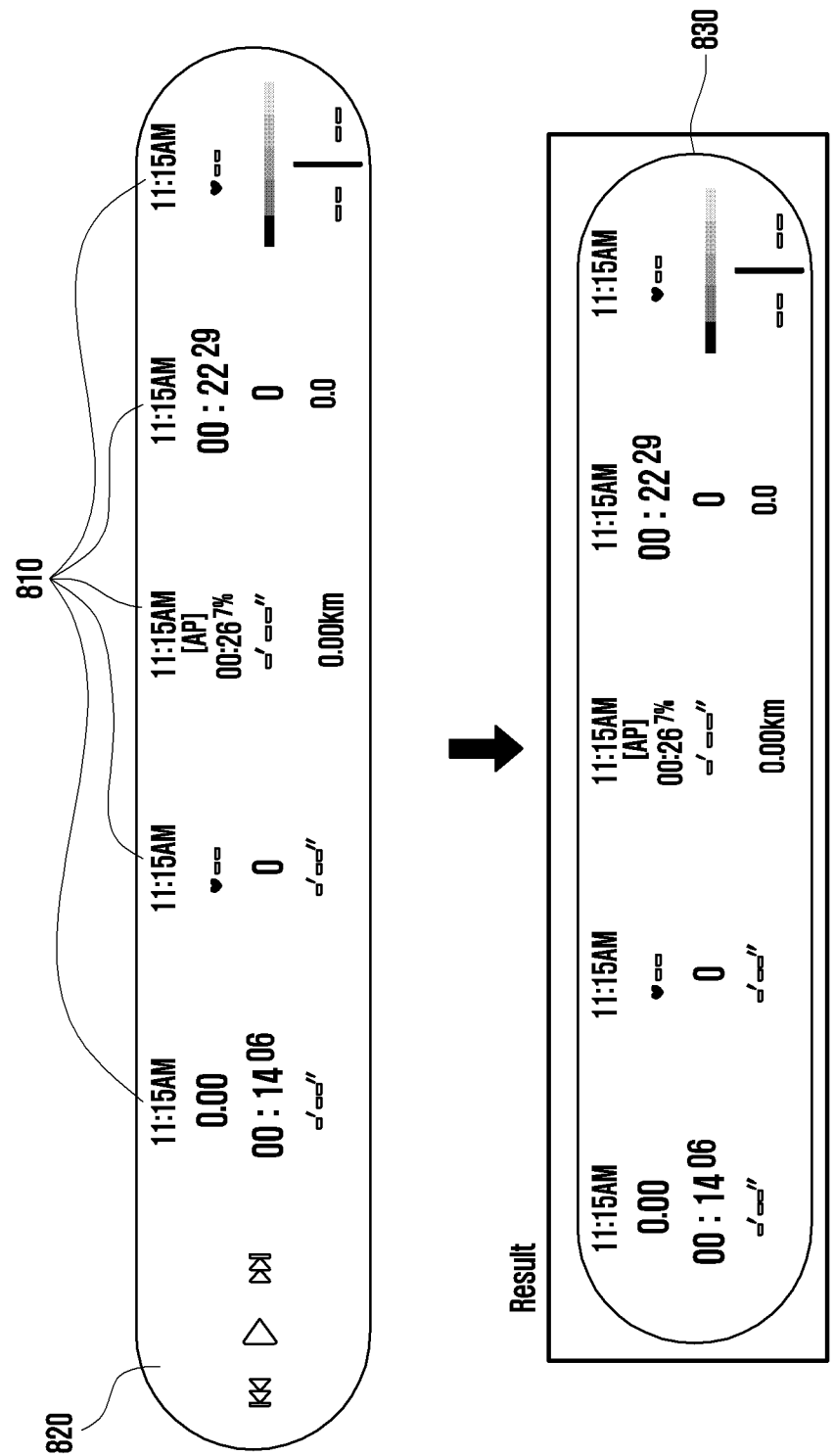

FIGS. 8C, 8D, and 8E are diagrams illustrating examples of enhanced smart capture images, according to various embodiments.

Referring to FIG. 8C, the processor 320 may capture only a screen to be captured 810, and not the screen to be excluded 820, among exercise application screens in a standby state in the enhanced smart capture mode to generate a smart capture image 830.

In FIG. 8C, the screen to be excluded 820 may include information sensitive or unnecessary to the user because it is not measured. For example, the screen to be excluded 820 may include an unmeasured step count, an unmeasured sleep pattern, an unmeasured stress index, an unmeasured calorie intake, and/or information related to women's health. Because the information included in the screen to be excluded 820 is not usable or sensitive information to the user, the processor 320 may perform a capture operation excluding the screen to be excluded 820 to provide a concise smart capture image 830 including only information necessary for the user (e.g., measured information).

Referring to FIG. 8D, in the enhanced smart capture mode, the processor 320 may capture only the screen to be captured 810 excluding the screen to be excluded 820 among widget application screens to generate a smart capture image 830.

In FIG. 8D, the screen to be excluded 820 from capture may be a screen including information determined to be unnecessary when generating a captured image, including meaningless data. The screen to be excluded 820 may include a watch screen, an activity notification screen, an unmeasured sleep and exercise selection mode screen, an electrocardiogram (ECG) recording mode screen, an unrecorded schedule information screen, an unacquired weather information screen, and/or an unplayed music screen. By excluding and capturing the screen to be excluded 820, the processor 320 may provide a concise smart capture image 830 including only a screen to be captured 810 including information necessary to the user (e.g., measured information).

Referring to FIG. 8E, in the enhanced smart capture mode, the processor 320 may capture only the screen to be captured 810, and not the screen to be excluded 820, among exercise application screens in an exercise state to generate the smart capture image 830.

In FIG. 8E, the screen to be excluded 820 from the capture may be a screen including information determined to be unnecessary when generating a captured image, including meaningless data. For example, the screen to be excluded

820 may include a music screen that is not played. By excluding and capturing the screen to be excluded 820, the processor 320 may provide a smart capture image 830 including only a screen to be captured 810 including information necessary for the user (e.g., measured exercise information).

Figure 9A:
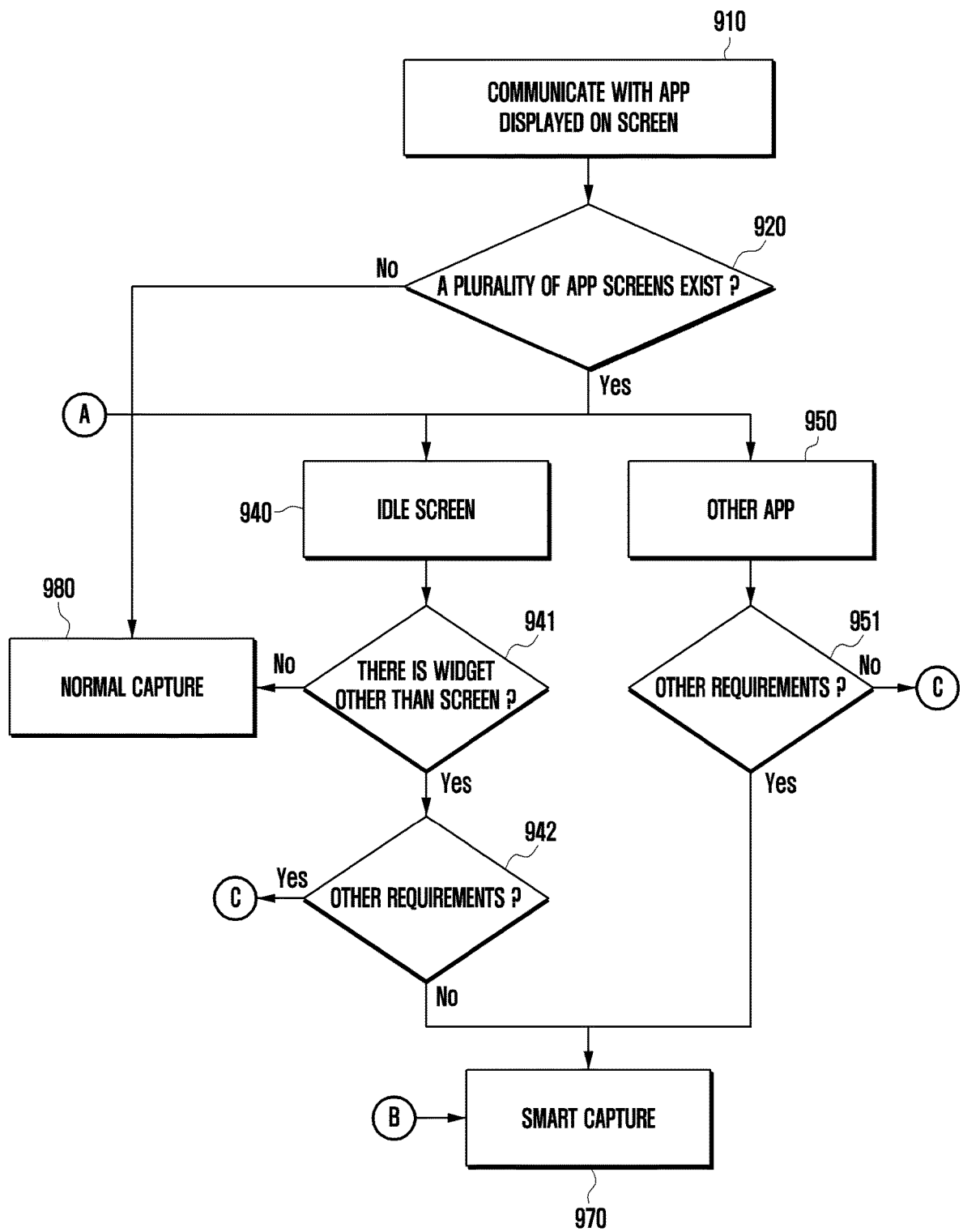
FIGS. 9A and 9B are flowcharts illustrating an operation in which a processor performs a normal capturing function, a smart capturing function, and/or an enhanced smart capturing function according to application-specific conditions, according to various embodiments.
Figure 9B:
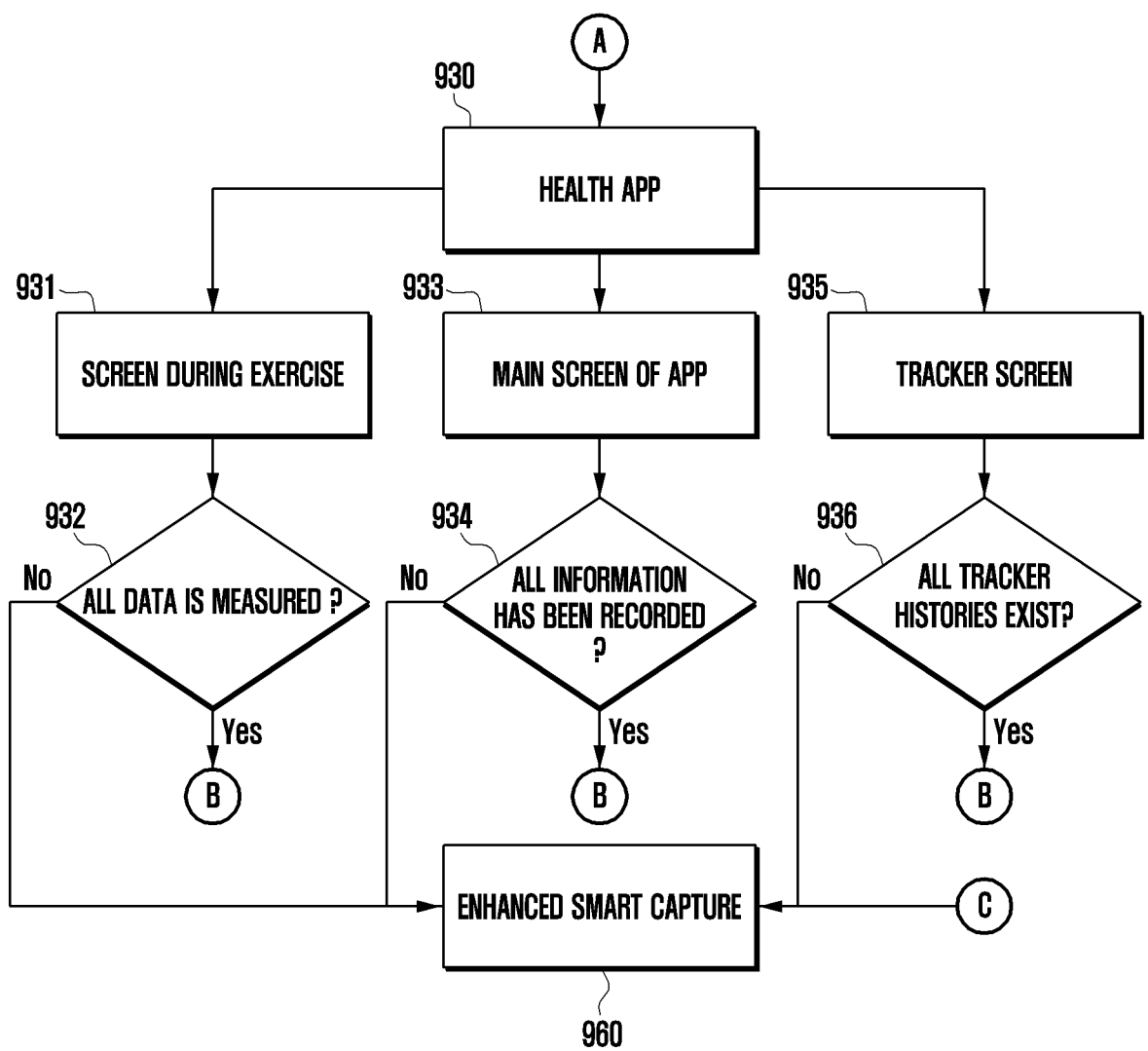

FIGS. 9A and 9B are flowcharts illustrating operations in which a processor (e.g., the processor 320 of FIG. 3) performs a normal capturing function (e.g., normal capture), a smart capturing function (e.g., smart capture), and/or an enhanced smart capturing function (e.g., enhanced smart capture) according to a condition, according to various embodiments.

FIGS. 9A and 9B are diagrams illustrating an operation of the processor 320 in a state in which an enhanced smart capture mode is activated.

Referring to FIGS. 9A-9B, the processor 320 communicates with an application related to a screen being output on a display (e.g., the display 360 of FIG. 3) in step 910. For example, the processor 320 may receive information on an application being currently displayed from the application manager 310 and communicate with the corresponding application (e.g., the application 340 of FIG. 3) based on the information of the application.

The processor 320 identifies whether a plurality of application screens exist in the application 340 in step 920.

The processor 320 determines that performing a smart capturing function is impossible when a plurality of application screens in the application 340 are absent (e.g., No in step 920). Accordingly, the processor 320 performs a normal capture operation (e.g., a normal capture function) in step 980.

The processor 320 may operate according to a type and condition of the application 340 when a plurality of application screens are present in the application 340 (e.g., Yes in step 920).

The processor 320 may classify a state of the screen being displayed by the application 340 to perform an operation differently when the application 340 is a health-related application, such as in step 930.

When a running exercise application is in a state of displaying a screen during exercise, as in step 931, the processor 320 identifies whether all data is measured in step 932 to perform a smart capturing function 970 or perform an enhanced smart capturing function 960. For example, if all data is not being measured, the processor 320 may perform the enhanced smart capturing function 960, and if all data is being measured, the processor 320 may perform a smart capturing function 970. That is, in order to capture screens, except a screen displaying unmeasured data, the processor 320 may perform an enhanced smart capturing function 970, and if all data is being measured, in order to capture screens displaying all data, the processor 320 may perform a smart capturing function 960.

When a running exercise application is in a state of displaying a main screen of the application, as in step 933, the processor 320 identifies whether all information has been recorded in step 934 to perform a smart capturing function 970 or an enhanced smart capturing function 960. For example, if all information has not been recorded, the processor 320 may perform an enhanced smart capturing function 960, and if all information has been recorded, the processor 320 may perform a smart capturing function 970. That is, in order to capture screens, except a screen displaying unrecorded information, the processor 320 may perform an enhanced smart capturing function 960, and if all information has been recorded, in order to capture screens displaying all information, the processor 320 may perform a smart capturing function 970.

When a running exercise application is in a state of displaying a tracker screen, as in step 935, the processor 320 identifies whether all tracker histories exist in step 936 to perform a smart capturing function 970 or an enhanced smart capturing function 960. For example, if all tracker histories do not exist, the processor 320 may perform a smart capturing function and/or an enhanced smart capturing function 960, and if all tracker histories exist, the processor 320 may perform a smart capturing function 970. That is, in order to capture screens, except a screen displaying information that does not have a tracker history, the processor 320 may perform an enhanced smart capturing function 960, and if all tracker histories exist, in order to capture a screen displaying all information, the processor 320 may perform a smart capturing function 970.

The processor 320 may change an operation according to a condition corresponding to the application 340 being an application related to an idle screen 940.

In step 941, the processor 320 determines whether there is a screen displaying a widget other than a screen being displayed in the idle screen application. When there is no screen displaying a widget other than a screen being displayed in the idle screen application (No in step 941), the processor 320 performs a normal capturing function 980, and if there is a screen displaying widget other than a screen being displayed, the processor 320 may perform a smart capturing function 970 and/or an enhanced smart capturing function 960 based on determining whether there are other requirements in step 942.

The processor 320 performs a smart capturing function in step 970 or an enhanced smart capturing function in step 960 according to a determination of whether other requirements are necessary in step 951. Other requirements may correspond to a preset condition of the application 340 being equivalent to the other application 950.

Figure 10A:
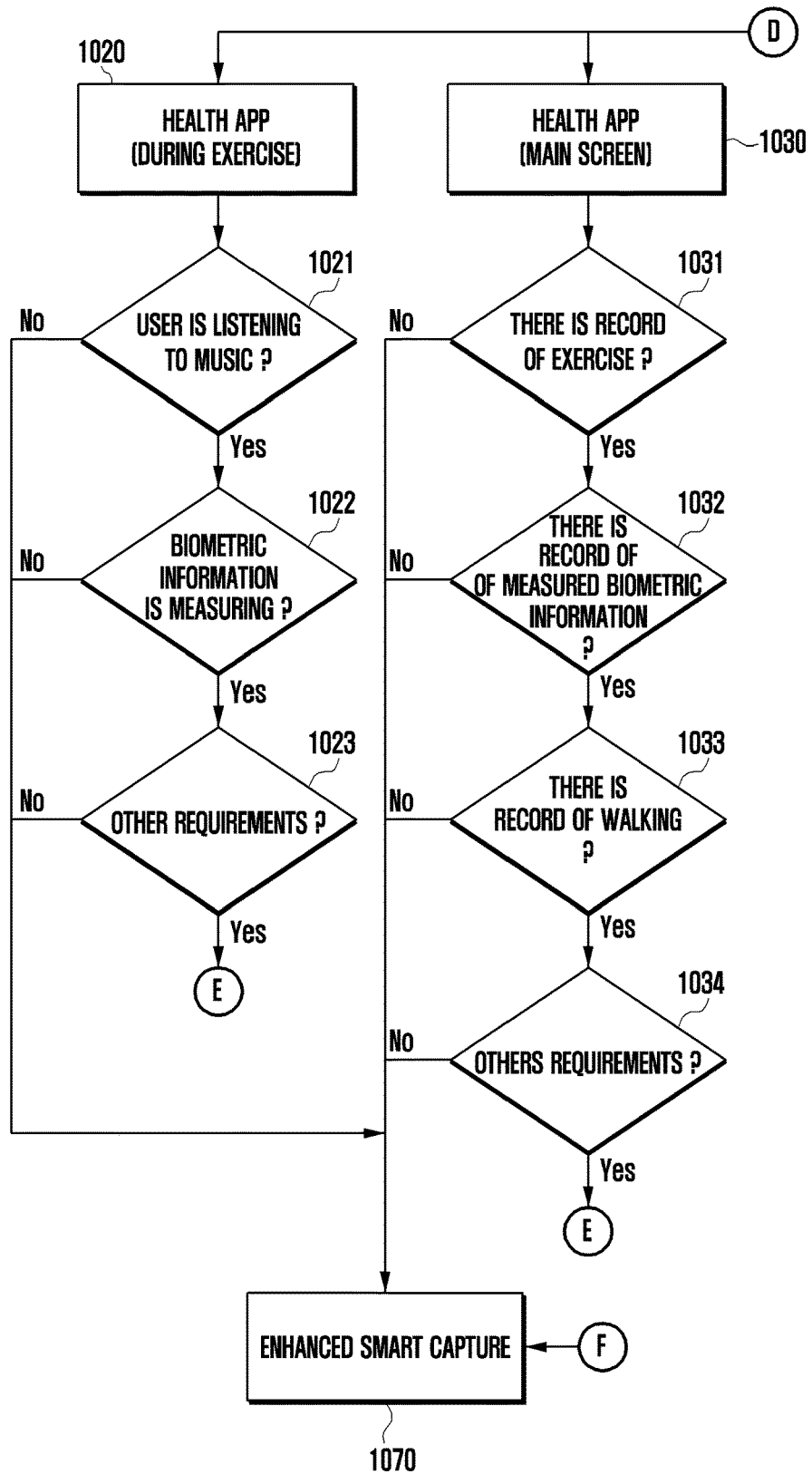
FIGS. 10A and 10B are flowcharts illustrating an operation of performing a smart capturing function or an enhanced smart capturing function according to application-specific conditions corresponding to a processor performing a smart capture operation, according to various embodiments.
Figure 10B:
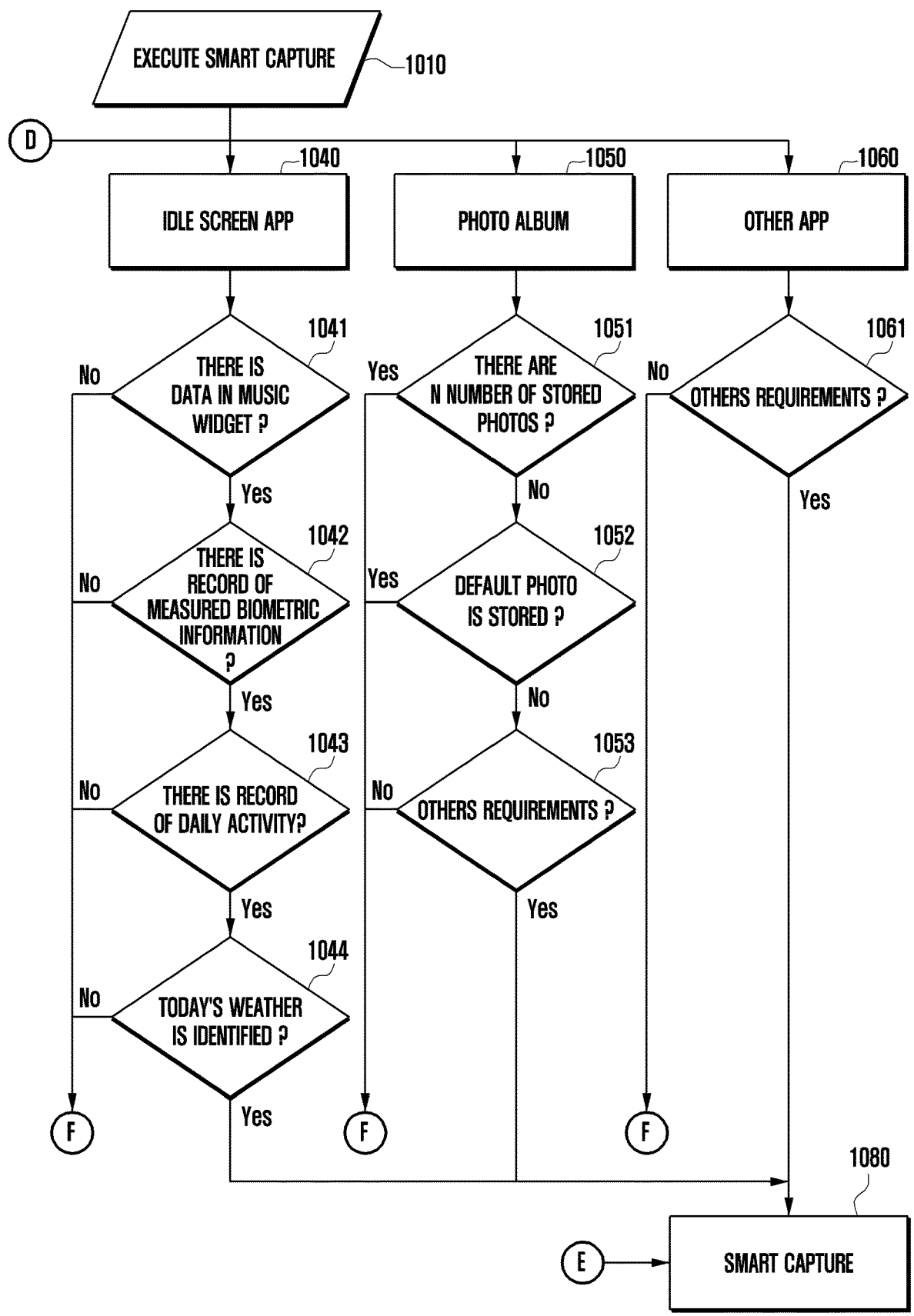

FIGS. 10A and 10B are flowcharts illustrating an operation of performing a smart capturing function or an enhanced smart capturing function according to a condition corresponding to a processor (e.g., the processor 320 of FIG. 3) performing a smart capture operation, according to various embodiments.

In FIGS. 10A and 10B, an enhanced smart capture mode may be activated.

Referring to FIGS. 10A-10B, the processor 320 executes a smart capturing function in step 1010. For example, the processor 320 may execute a smart capturing function according to steps 410 to 460 of FIG. 4.

The processor 320 may operate according to a type of the application 340 displayed on the screen.

The processor 320 may perform an enhanced smart capturing function 1070 and/or a smart capturing function 1080 according to a condition corresponding to a displayed application being a health-related application and being in a state of displaying a screen during exercise in step 1020.

The processor 320 performs an enhanced smart capturing function in step 1070 or a smart capturing function in step 1080 based on a plurality of conditions, such as whether the user is listening to music in step 1021, whether biometric information (e.g., heart rate information) is measured in step 1022, and whether there are other requirements in step 1023. If at least one of the plurality of conditions in steps 1021, step 1022, or step 1023, is not satisfied, the processor 320 performs an enhanced smart capturing function in step 1070 that captures only a screen without an unmeasured value. If all conditions are satisfied, the processor 320 performs a smart capturing function in step 1080.

The processor 320 performs an enhanced smart capturing function in step 1070 or a smart capturing function in step 1080 when a health-related application is in a state of displaying the main screen in step 1030.

The processor 320 performs an enhanced smart capturing function 1070 or a smart capturing function 1080 based on a plurality of conditions, such as whether there is a record of exercise in step 1031, whether there is a record of measured biometric information (e.g., whether there is a record of blood oxygen saturation (SpO2)) in step 1032, whether there is a record of walking in step 1033, and whether there are other requirements in step 1034. If at least one of the plurality of conditions is not satisfied, the processor 320 performs an enhanced smart capturing function in step 1070 that captures only a screen without an unmeasured value, and if all conditions are satisfied, the processor 320 performs a smart capturing function in step 1080.

The processor 320 performs an enhanced smart capturing function in step 1070 or a smart capturing function in step 1080 when an application being displayed is an idle screen application 1040.

The processor 320 performs an enhanced smart capturing function in step 1070 or a smart capturing function in step 1080 based on a plurality of conditions, such as whether there is data in a music widget in step 1041, whether there is a record of measured biometric information (e.g., whether there is a record of SpO2) in step 1042, whether there is a record of daily activity in step 1043, and whether today's weather is identified in step 1044. If at least one condition of the plurality of conditions is not satisfied, the processor 320 performs an enhanced smart capturing function in step 1070 that captures only a screen, not including unrecorded information, and if all conditions are satisfied, the processor 320 performs a smart capturing function 1080.

The processor 320 performs an enhanced smart capturing function in step 1070 or a smart capturing function in step 1080 when a photo album application is displayed in step 1050.

The processor 320 performs an enhanced smart capturing function 1070 or a smart capturing function 1080 based on a plurality of conditions, such as whether the number of stored photos is greater than or equal to a specified number in step 1051 and whether a default photo is stored in step 1052. If at least one of the plurality of conditions is not satisfied, the processor 320 performs an enhanced smart capturing function 1070 that captures only a screen without capturing unnecessary information, and if all conditions are satisfied, the processor 320 performs a smart capturing function 1080.

The processor 320 performs an enhanced smart capturing function 1070 or a smart capturing function 1080 according to a condition corresponding to when an application being displayed is another application in step 1060.

An electronic device according to various embodiments of the disclosure includes a display and a processor operatively connected to the display, wherein the processor may receive a smart capture request capturing a plurality of screens including a screen of an application being displayed on the display from a user and a screen of an application not being displayed on the display, smart capture the plurality of screens according to the request, and generate a smart capture image based on the plurality of captured screens.

The processor may obtain a capture request from the user before receiving the smart capture request, identify whether performing a smart capturing function is possible in an application related to a screen being output on a display when the capture request is received, display a smart capture interface indicating that performing a smart capturing function is possible on the display when it is determined that performing a smart capturing function is possible in the application, and obtain the smart capture request from the user through the smart capture interface.

The processor may determine that performing a smart capturing function is possible in the application when a plurality of screens are configured to display information by the application.

The processor may generate a smart capture image excluding a screen including a designated type of information among the plurality of screens.

The processor may generate a smart capture image excluding a screen including at least one of personal information, unmeasured data, or non-public information.

The processor may activate or deactivate a mode of generating a smart capture image excluding a screen including a designated type of information among the plurality of screens.

The processor may request, to the application, whether the screen includes a designated type of information and determine whether to capture the screen based on whether the designated type of information is included on the screen.

The processor may not capture the screen when the screen includes at least one of personal information, unmeasured information, or non-public information.

The processor may capture a first screen of the plurality of screens, request whether a second screen, which is a screen that is immediately before or after the first screen, exists to the application, and generate a smart capture image based on whether the second screen exists.

The processor may generate a smart capture image in the form of switching the plurality of captured screens at designated time intervals.

A method of operating an electronic device according to various embodiments of the disclosure includes obtaining, from a user, a smart capture request for capturing a plurality of screens including a screen of an application being displayed on a display and a screen of an application not being displayed on the display, smart capturing the plurality of screens according to the request, and generating a smart capture image based on the plurality of captured screens.

The method may further include obtaining a capture request from a user before receiving a smart capture request, identifying whether performing a smart capturing function is possible in an application related to a screen being output on a display when the capture request is received; displaying a smart capture interface indicating that performing a smart capturing function is possible on the display when it is determined that performing a smart capturing function is possible in the application; and obtaining the smart capture request from the user through the smart capture interface.

The method may further include determining that performing a smart capturing function is possible in the application when the plurality of screens are configured to display information by the application.

The method may further include generating a smart capture image excluding a screen including a designated type of information among the plurality of screens.

The method may further include generating a smart capture image excluding a screen including at least one of personal information, unmeasured data, and non-public information.

The method may further include activating or deactivating a mode of generating a smart capture image excluding a screen including a designated type of information among the plurality of screens.

The method may further include requesting whether the screen includes a designated type of information to the application; and determining whether to capture the screen based on whether designated type of information is included on the screen.

The method may further include not capturing the screen when the screen includes at least one of personal information, unmeasured information, or non-public information.

The method may further include capturing a first screen of the plurality of screens, requesting, to the application, whether a second screen, which is a screen that is immediately before or after the first screen, exists, and generating a smart capture image based on whether the second screen exists.

The method may further include generating a smart capture image in the form of switching the plurality of captured screens at designated time intervals.

Various embodiments of this document and terms used for the embodiments are not intended to limit technical features described in this document to specific embodiments, and should be understood to include various modifications, equivalents, or substitutions of the embodiments.

In connection with the description of the drawings, like reference numerals may be used for similar or related components. The singular form of the noun corresponding to an item may include one or more of the item, unless the relevant context clearly dictates otherwise.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

The invention claimed is:

1. An electronic device, comprising:
a display; and
a processor operatively connected to the display,
wherein the processor is configured to:
identify whether a specific application execution screen includes a first screen displayed on the display and at least one second screen being not displayed on the display;
display a first type capture interface based on identifying that the specific application execution screen includes both the first screen and the at least one second screen;
execute a first type capture based on a user input received on the first type capture interface, the first type capture being capturing both the first screen and the at least one second screen;
display a second type capture interface based on identifying that the specific application execution screen includes only the first screen displayed on the display without the at least one second screen; and
execute a second type capture based on a user input received on the second type capture interface, the second type capture being capturing the first screen displayed on the display.

2. The electronic device of claim 1, wherein the processor is further configured to:
before receiving the smart capture request,
obtain a capture request from the user, and
determine whether the smart capture is possible when the capture request is received.

3. The electronic device of claim 2, wherein the processor is further configured to determine that the smart capture is possible in the application when the plurality of screens are configured to display information by the application.

4. The electronic device of claim 1, wherein the processor is further configured to generate a smart capture image excluding a screen including a designated type of information among the plurality of screens.

5. The electronic device of claim 4, wherein the processor is further configured to generate a smart capture image excluding a screen including at least one of personal information, unmeasured data, or non-public information.

6. The electronic device of claim 4, wherein the processor is further configured to activate or deactivate a mode of generating a smart capture image excluding a screen including a designated type of information among the plurality of screens.

7. The electronic device of claim 4, wherein the processor is further configured to:
request, to the application, whether the screen includes a designated type of information, and
determine whether to capture the screen based on whether the designated type of information is included on the screen.

8. The electronic device of claim 7, wherein the processor is further configured to not capture the screen when the screen includes at least one of personal information, unmeasured information, or non-public information.

9. The electronic device of claim 1, wherein the processor is further configured to:
capture a first screen of the plurality of screens,
request, to the application, whether a second screen, which is a screen that is immediately before or after the first screen, exists, and
generate a smart capture image based on whether the second screen exists.

10. The electronic device of claim 1, wherein the processor is further configured to generate a smart capture image in the form of switching the plurality of captured screens at designated time intervals.

11. A method of operating an electronic device, the method comprising:
identifying whether a specific application execution screen includes a first screen displayed on the display and at least one second screen being not displayed on the display;
displaying a first type capture interface based on identifying that the specific application execution screen includes both the first screen and the at least one second screen;
executing a first type capture based on a user input received on the first type capture interface, the first type capture being capturing both the first screen and the at least one second screen;
displaying a second type capture interface based on identifying that the specific application execution screen includes only the first screen displayed on the display without the at least one second screen; and
executing a second type capture based on a user input received on the second type capture interface, the second type capture being capturing the first screen displayed on the display.

12. The method of claim 11, further comprising:
obtaining a capture request from the user before receiving the smart capture request; and
determining whether the smart capture is possible when the capture request is received.

13. The method of claim 12, further comprising determining that the smart capture is possible in the application when the plurality of screens are configured to display information by the application.

14. The method of claim 11, further comprising generating a smart capture image excluding a screen including a designated type of information among the plurality of screens.

15. The method of claim 14, further comprising generating a smart capture image excluding a screen including at least one of personal information, unmeasured data, or non-public information.

16. The method of claim 14, further comprising activating or deactivating a mode of generating a smart capture image excluding a screen including a designated type of information among the plurality of screens.

17. The method of claim 14, further comprising:
requesting, to the application, whether the screen includes a designated type of information; and
determining whether to capture the screen based on whether a designated type of information is included on the screen.

18. The method of claim 17, further comprising not capturing the screen when the screen includes at least one of personal information, unmeasured information, or non-public information.

19. The method of claim 11, further comprising:
capturing a first screen of the plurality of screens;
requesting, to the application, whether a second screen, which is a screen that is immediately before or after the first screen, exists; and
generating a smart capture image based on whether the second screen exists.

20. The method of claim 11, further comprising generating a smart capture image in the form of switching the plurality of captured screens at designated time intervals.

* * * * *